US012422568B2

(12) United States Patent
Kumar et al.

(10) Patent No.: US 12,422,568 B2
(45) Date of Patent: Sep. 23, 2025

(54) POSITION UNCERTAINTY MANAGEMENT DURING A LACK OF BEACON SIGNAL RECEPTION

(71) Applicant: QUALCOMM Incorporated, San Diego, CA (US)

(72) Inventors: Mukesh Kumar, Bangalore (IN); Chandrasekhar Jayaram, Bangalore (IN); Srinivas Gangji, Bangalore (IN); Santoshkumar Zalake, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 18/157,760

(22) Filed: Jan. 20, 2023

(65) Prior Publication Data

US 2024/0248216 A1 Jul. 25, 2024

(51) Int. Cl.
*H04L 1/00* (2006.01)
*G01S 19/40* (2010.01)
*G01S 19/46* (2010.01)
*G01S 19/52* (2010.01)

(52) U.S. Cl.
CPC .............. *G01S 19/46* (2013.01); *G01S 19/40* (2013.01); *G01S 19/52* (2013.01)

(58) Field of Classification Search
CPC . H04L 63/0435; H04L 9/14; G06F 17/30241; G01S 19/46; G01S 19/40; G01L 27/005; G01L 19/00; G01C 21/3492; G01C 21/16; H04W 4/40; H04W 4/48; H04W 12/06; B64C 39/02; G06K 7/1408
See application file for complete search history.

(56) References Cited

U.S. PATENT DOCUMENTS

| 10,725,139 B1* | 7/2020 | Duksta ................. G01S 5/0244 |
| 2019/0360886 A1* | 11/2019 | Dormody .............. G01L 27/005 |
| 2022/0099844 A1 | 3/2022 | Ische et al. |

FOREIGN PATENT DOCUMENTS

| WO | 2011109860 A1 | 9/2011 |
| WO | 2018190980 | 10/2018 |

OTHER PUBLICATIONS

International Search Report and Written Opinion—PCT/US2024/010572—ISA/EPO—Apr. 29, 2024.

\* cited by examiner

*Primary Examiner* — Phuoc H Doan
(74) *Attorney, Agent, or Firm* — Procopio, Cory, Hargreaves & Savitch LLP

(57) ABSTRACT

A first user equipment (UE) may receive a first set of beacon signals from a set of global navigation satellite system (GNSS) devices. The first UE may restrict growth of a position uncertainty (PUNC) value associated with the first UE based on a maximum vehicle speed and based on a lack of a reception of a beacon signal from the set of GNSS devices within a threshold period of time. The first UE may restrict growth of the PUNC value further based on a relative velocity profile associated with the first UE. The first UE may receive a message including a second relative velocity profile from a second UE. The first UE may calculate the relative velocity profile based on the second relative velocity profile.

30 Claims, 15 Drawing Sheets

POSITION UNCERTAINTY MANAGEMENT DURING A LACK OF BEACON SIGNAL RECEPTION

TECHNICAL FIELD

The present disclosure relates generally to communication systems, and more particularly, to a positioning management system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first user equipment (UE). The apparatus may receive a first set of beacon signals from a set of global navigation satellite system (GNSS) devices, such as GNSS space vehicles (GNSS SVs). The apparatus may restrict growth of a position uncertainty (PUNC) value associated with the first UE based on a maximum vehicle speed and based on a lack of a reception of a beacon signal from the set of GNSS devices within a threshold period of time.

In an aspect of the disclosure, a method, a computer-readable medium, and an apparatus are provided. The apparatus may include a second UE. The apparatus may receive at least a first set of beacon signals from a set of GNSS devices or a second set of beacon signals from a set of road side units (RSUs). The apparatus may calculate a relative velocity profile based on at least one of the first set of beacon signals or the second set of beacon signals. The apparatus may transmit a set of messages including at least a portion of the relative velocity profile to a first UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
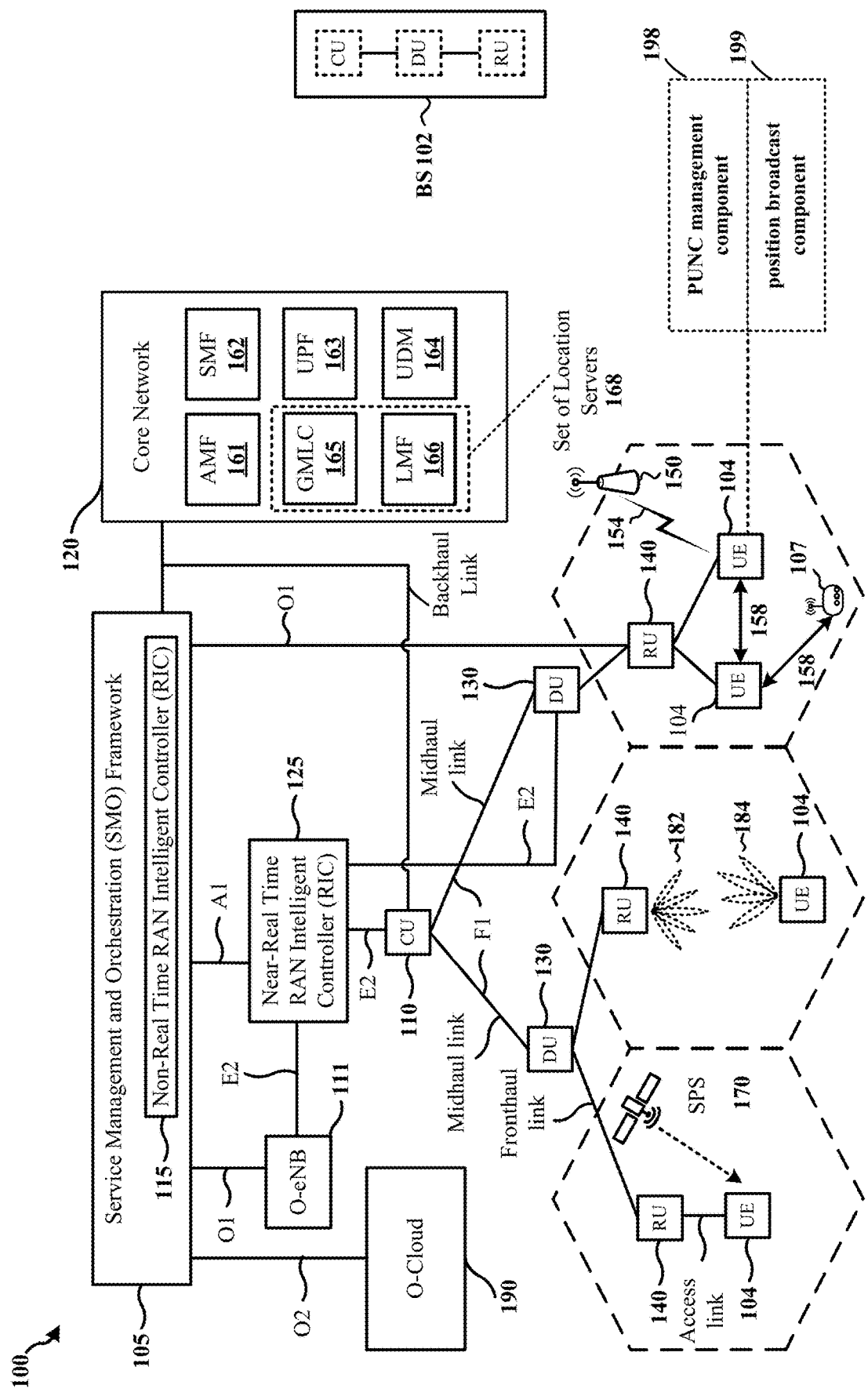
FIG. 1 is a diagram illustrating an example of a wireless communications system and an access network.

When a user equipment (UE) is unable to receive beacon signals from a set of long-range (LR) beacon devices, such as global navigation satellite system (GNSS) devices, the UE may be unable to reliably determine its current position relative to its last known position. While the UE is unable to receive beacon signals from the LR beacon devices, the UE may increase a position uncertainty (PUNC) value associated with the UE. The PUNC value may be a value that the UE uses to calculate a certainty of its position. A larger PUNC value may represent a greater amount of uncertainty, and a smaller PUNC value may represent a smaller amount of uncertainty. After the UE is able to receive beacon signals from the LR beacon devices, the UE may perform positioning based on its PUNC value. The UE may perform simple positioning if its PUNC value is small, but may perform more complex, and resource-intensive positioning if its PUNC value is large.

The UE may be configured to increase growth of a PUNC value at different rates based upon how long the UE lacks beacon reception. For example, in response to the UE lacking reception of a beacon signal from a set of LR beacon devices for a threshold period of time, the UE may be configured to increase growth of a PUNC value linearly for a first time period, exponentially for a second time period, and quadratically for a third time period. However, increasing growth of a PUNC value so drastically may not be practical if the UE has certain environmental constraints, for example if the UE is associated with a vehicle that cannot exceed a maximum vehicle speed, if the UE is stuck in traffic, or if the UE is parked and is not moving. In some aspects, the UE may be configured to receive beacon signals from a set of short-range (SR) beacon devices, such as road-side units (RSUs) or other UEs, to accurately restrict growth of its PUNC value.

Accurately constraining growth of the PUNC value may decrease resources used by the UE in performing positioning later when the UE is able to receive beacon signals from the set of LR beacon devices after a period of non-reception (e.g., if the UE is in a GNSS denied environment for a period of time, and then moves to an environment where the UE may perform a GNSS fix). This may result in a faster time to converge for a GNSS fix, less power consumption to perform the GNSS fix, and an optimal acquisition task allocation.

Various aspects relate generally to UEs that restrict growth of its PUNC value based upon a maximum vehicle speed associated with the UE. Other aspects relate generally to UEs that rely upon beacon signals from SR beacon devices to calculate a position of the UE. Some aspects more specifically relate to UEs that rely upon LR beacon devices, such as GNSS devices, to perform positioning. In some examples, a first UE may receive a first set of beacon signals from a set of GNSS devices. The first UE may restrict growth of a PUNC value associated with the first UE based on a maximum vehicle speed and based on a lack of a reception of a beacon signal from the set of GNSS devices within a threshold period of time. The first UE may restrict growth of the PUNC value further based on a relative velocity profile associated with the first UE. The first UE may calculate the relative velocity profile based upon a second set of beacon signals received from a set of RSUs. The first UE may receive a message including a second relative velocity profile from a second UE. The first UE may calculate the relative velocity profile based on the second relative velocity profile.

Particular aspects of the subject matter described in this disclosure can be implemented to realize one or more of the following potential advantages. In some examples, by restricting growth of a PUNC value, the described techniques can be used to decrease the time for a UE to converge to a GNSS fix. The UE may use less power to perform positioning after lacking reception of beacon signals from a set of LR beacon devices. The UE may optimally deploy acquisition task allocations. When a UE associated with a vehicle moves out from an area where the UE is unable to receive beacon signals, the UE may transmit a better estimate of its vehicle location via basic safety messages (BSMs). Restricting growth of a PUNC value may also help in characterizing spurious signals, such as jamming or spoofing, resulting in a more robust system for calculating a position of the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a PUNC management component 198 that may be configured to receive a first set of beacon signals from a set of GNSS devices. The PUNC management component 198 may be configured to restrict growth of a PUNC value associated with the UE 104 based on a maximum vehicle speed and based on a lack of a reception of a beacon signal from the set of GNSS devices within a threshold period of time. In certain aspects, the UE 104 may have a position broadcast component 199 that may be configured to receive at least a first set of beacon signals from a set of GNSS devices or a second set of beacon signals from a set of RSUs. The position broadcast component 199 may be configured to calculate a relative velocity profile based on at least one of the first set of beacon signals or the second set of beacon signals. The position broadcast component 199 may be configured to transmit a set of messages including at least a portion of the relative velocity profile to another UE. In other words, the UE 104 may be configured to restrict growth of a PUNC value based upon other information, such as a maximum vehicle speed, in response to a lack of reception of a beacon signal from a set of devices, such as a set of GNSS devices.

Figure 2:
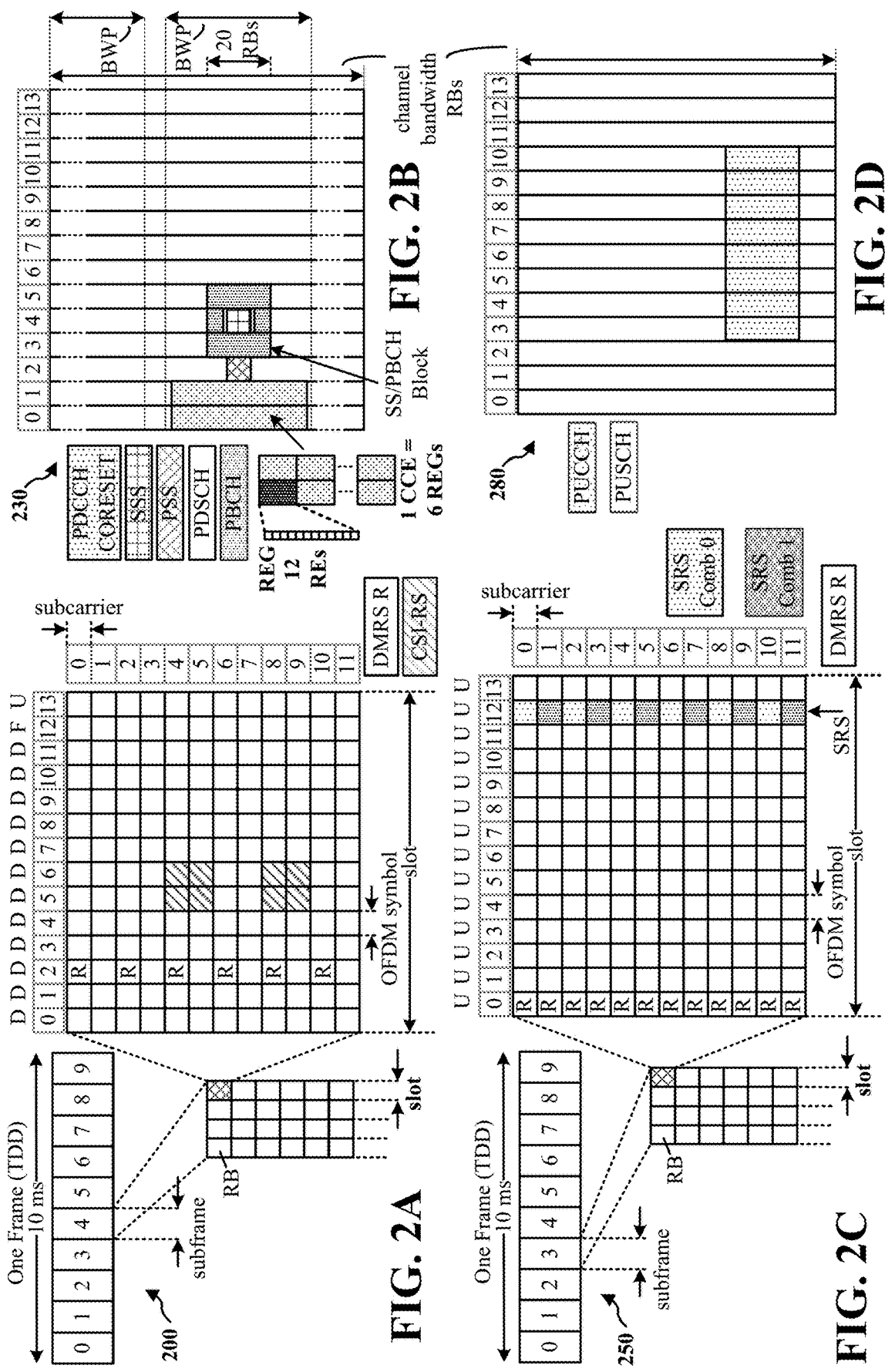
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[KHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 1-continued

Numerology, SCS, and CP

| $\mu$ | SCS<br>$\Delta f = 2^\mu \cdot 15[KHz]$ | Cyclic<br>prefix |
|---|---|---|
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
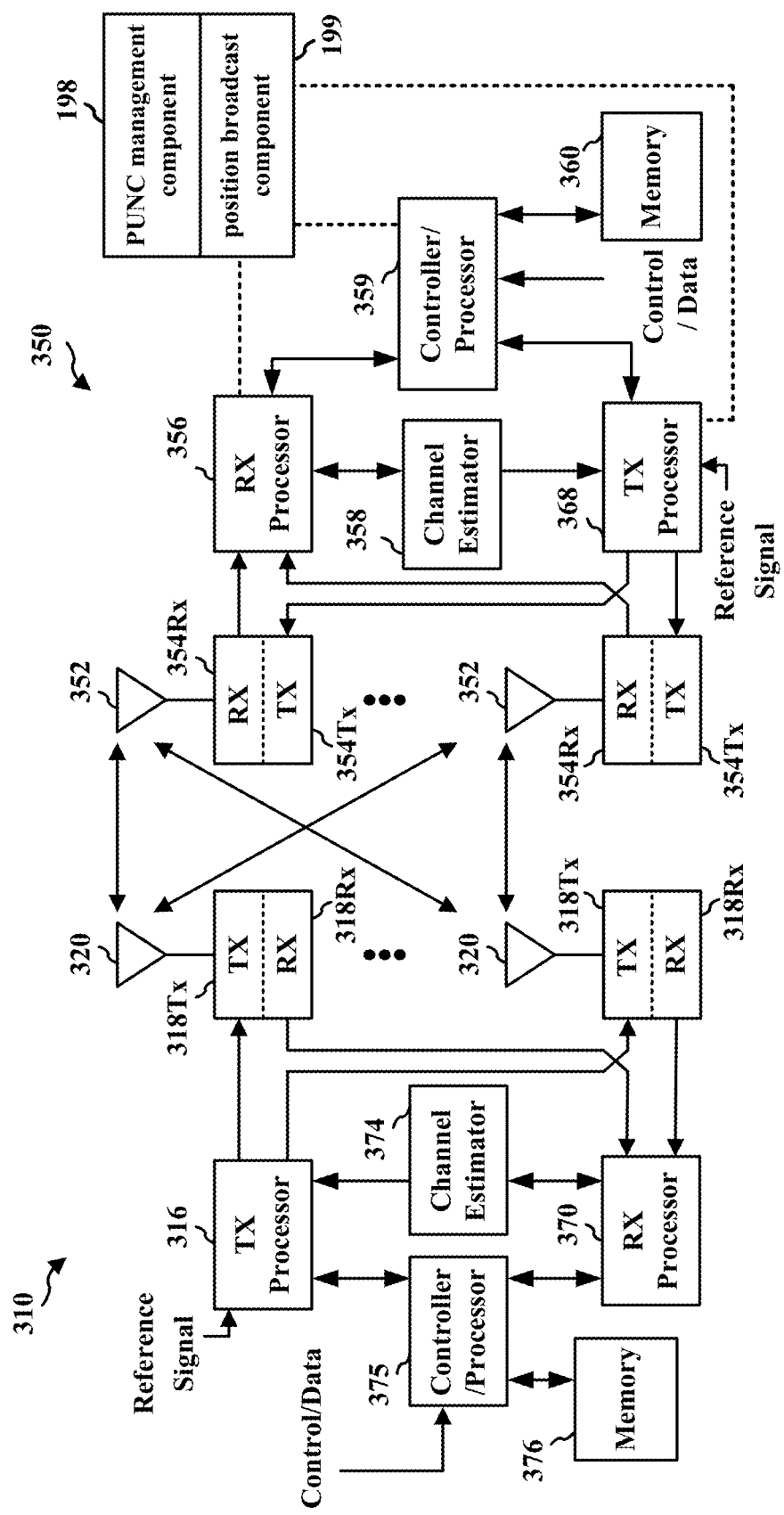
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1.

At least one of the TX processor 368, the RX processor 356, and the controller/processor 359 may be configured to perform aspects in connection with the component 199 of FIG. 1.

Figure 4:
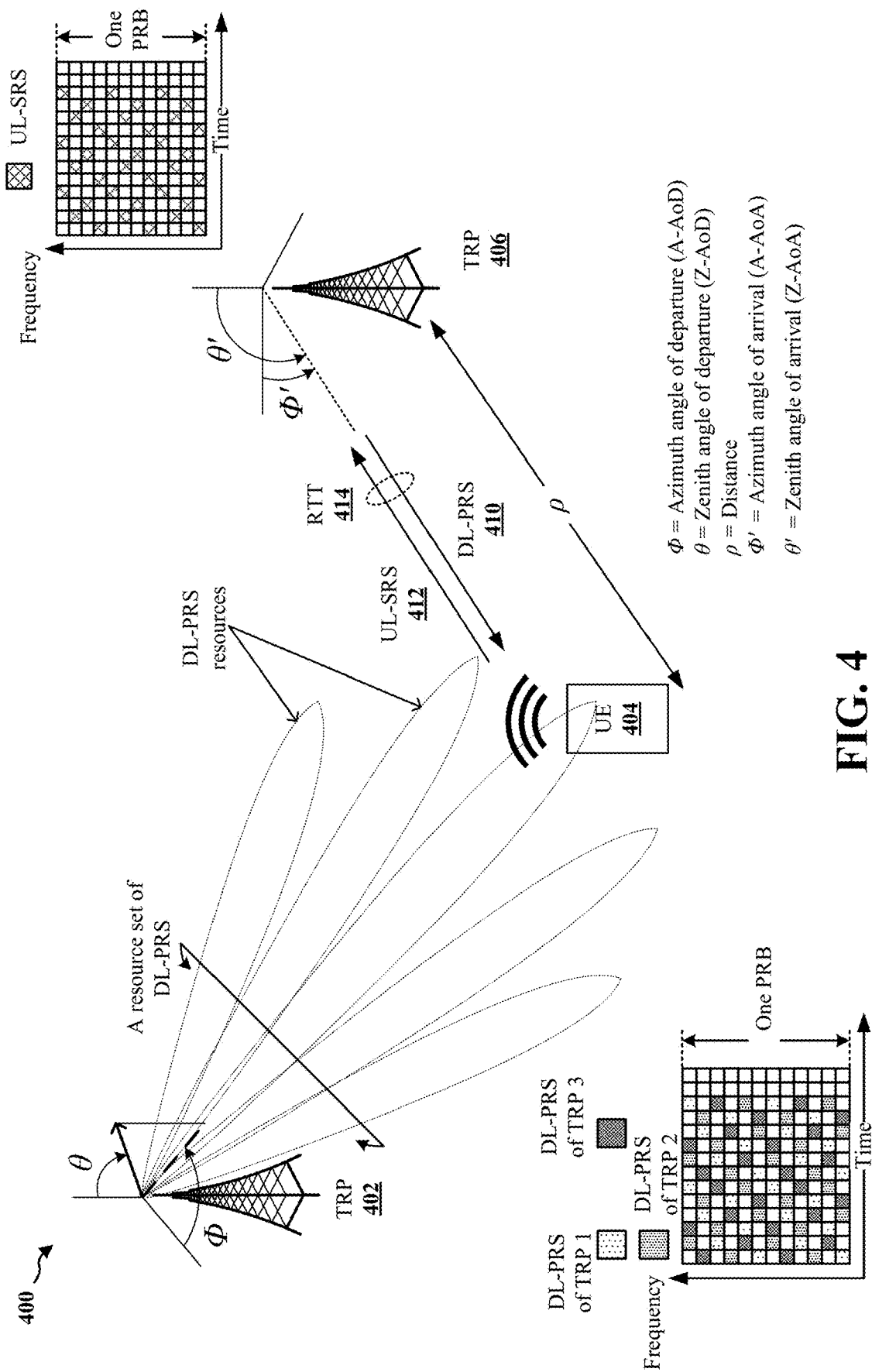
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}\| - |T_{SRS\_TX} - T_{PRS\_RX}|\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
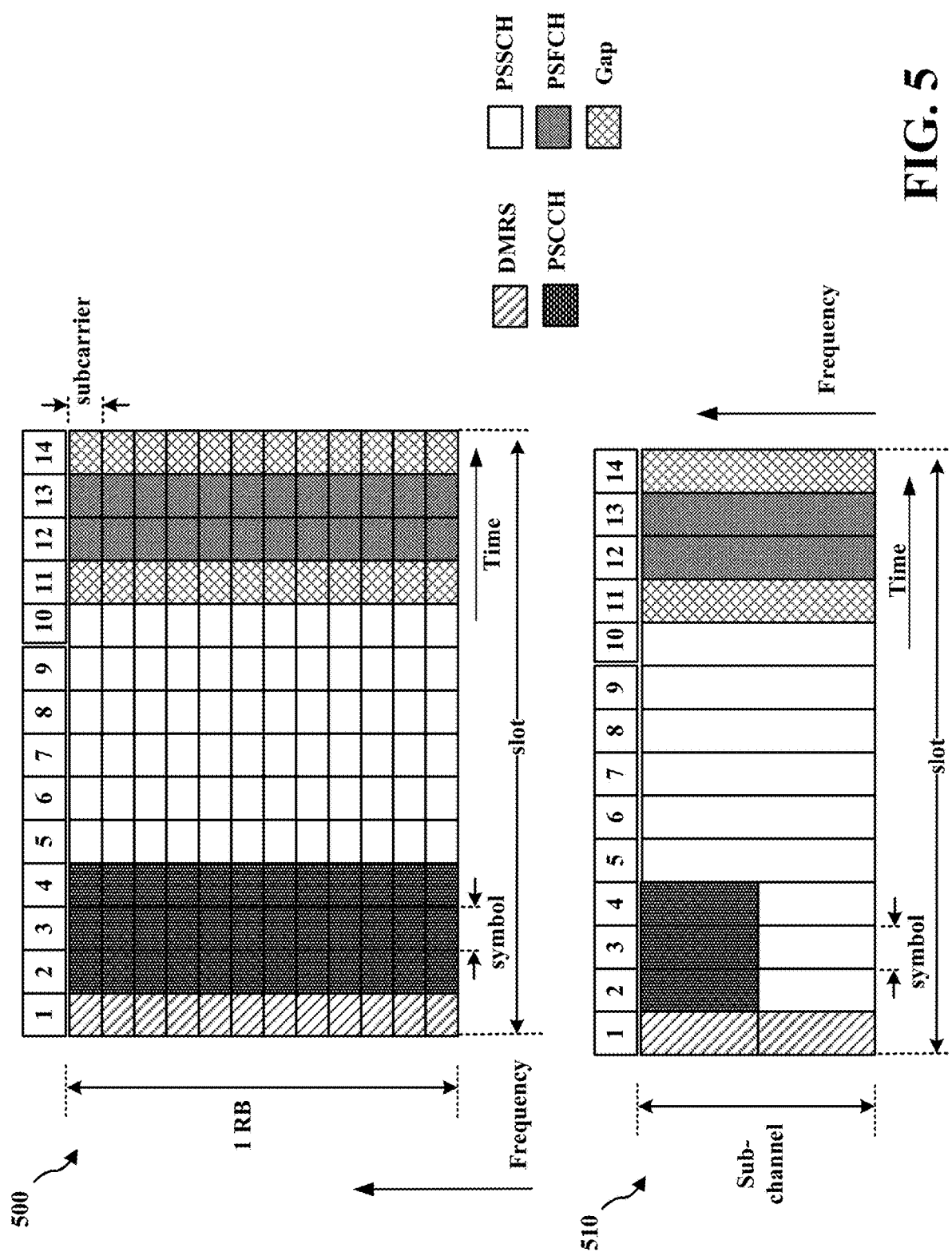
FIG. 5 is a diagram illustrating example aspects of a sidelink slot structure.

FIG. 5 includes diagrams 500 and 510 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 5 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 500 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 510 in FIG. 5 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 5, some of the REs may include control information in PSCCH and some REs may include demodulation RS (DMRS). At least one symbol may be used for feedback. FIG. 5 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 5. Multiple slots may be aggregated together in some aspects.

Figure 6:
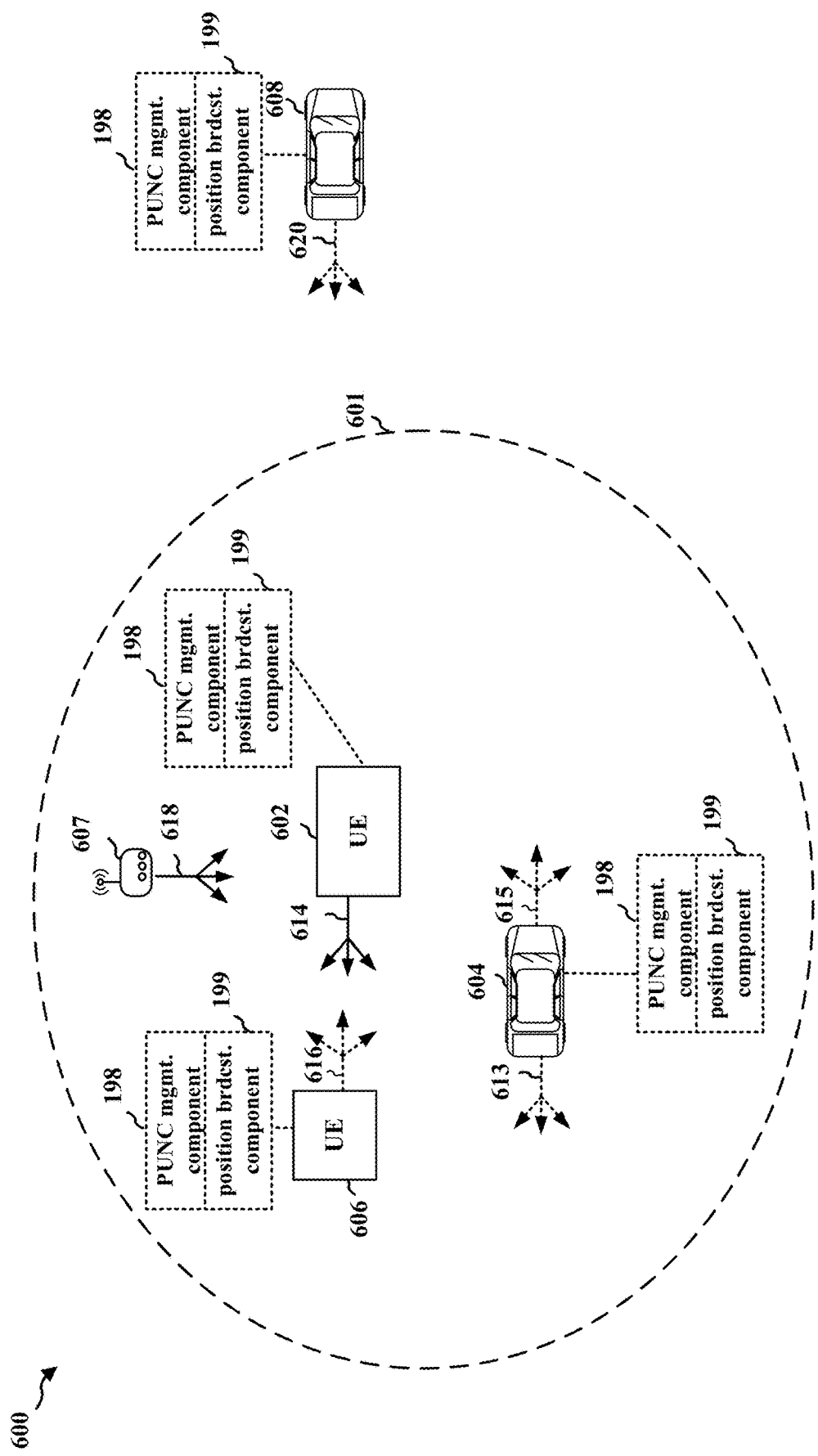
FIG. 6 is a diagram illustrating example aspects of sidelink communication between devices, in accordance with aspects presented herein.

FIG. 6 illustrates a diagram 600 of sidelink communication between devices. The communication may be based on a slot structure including aspects described in connection with FIG. 6. For example, the UE 602 may transmit a sidelink transmission 614, e.g., including a control channel (e.g., PSCCH) and/or a corresponding data channel (e.g., PSSCH), that may be received by UEs 604, 606, 608. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 602, 604, 606, 608 may each be capable of sidelink transmission in addition to sidelink reception. Thus, UEs 604, 606, 608 are illustrated as transmitting sidelink transmissions 613, 615, 616, 620. The sidelink transmissions 613, 614, 615, 616, 620 may be unicast, broadcast or multicast to nearby devices. For example, UE 604 may transmit sidelink transmissions 613, 615 intended for receipt by other UEs within a range 601 of UE 604, and UE 606 may transmit sidelink transmission 616. Additionally, or alternatively, RSU 607 may receive communication from and/or transmit communication 618 to UEs 602, 604, 606, 608. One or more of the UEs 602, 604, 606, 608 or the RSU 607 may include a PUNC management component 198 or a position broadcast component 199 as described in connection with FIG. 1. A sidelink transmission may include a sidelink synchronization signal (SLSS).

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 7:
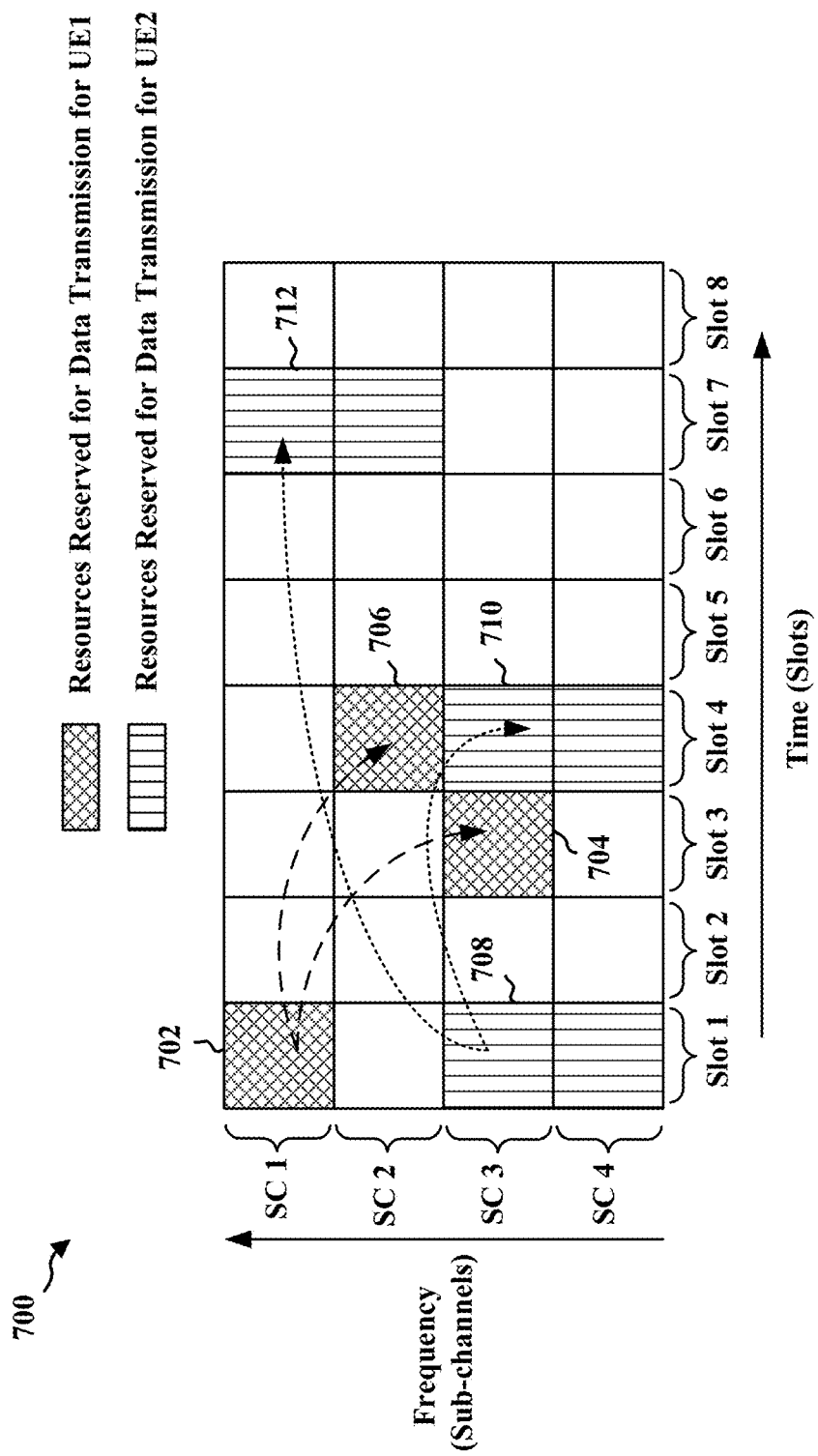
FIG. 7 is a diagram illustrating examples of resource reservation for sidelink communication.

FIG. 7 is an example 700 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 700, which provides 32 available resource blocks in total. This window may also be referred to as a resource selection window.

A first UE ("UE1") may reserve a sub-channel (e.g., SC 1) in a current slot (e.g., slot 1) for its initial data transmission 702, and may reserve additional future slots within the window for data retransmissions (e.g., 704 and 706). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 7 illustrates that a second UE ("UE2") may reserve resources in sub-channels SC 3 and SC 4 at time slot 1 for a data transmission 708 at a current time, and reserve a data transmission 710 at time slot 4 using sub-channels SC 3 and SC 4, and reserve a data transmission 712 at time slot 7 using sub-channels SC 1 and SC 2 as shown by FIG. 7. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 7 illustrates resources being reserved for an initial transmission and two retransmissions, the reservation may be for an initial transmission and a single transmission or just for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 7, the UE may transmit SCI reserving resources for data transmissions 708, 710, and 712.

Figure 8:
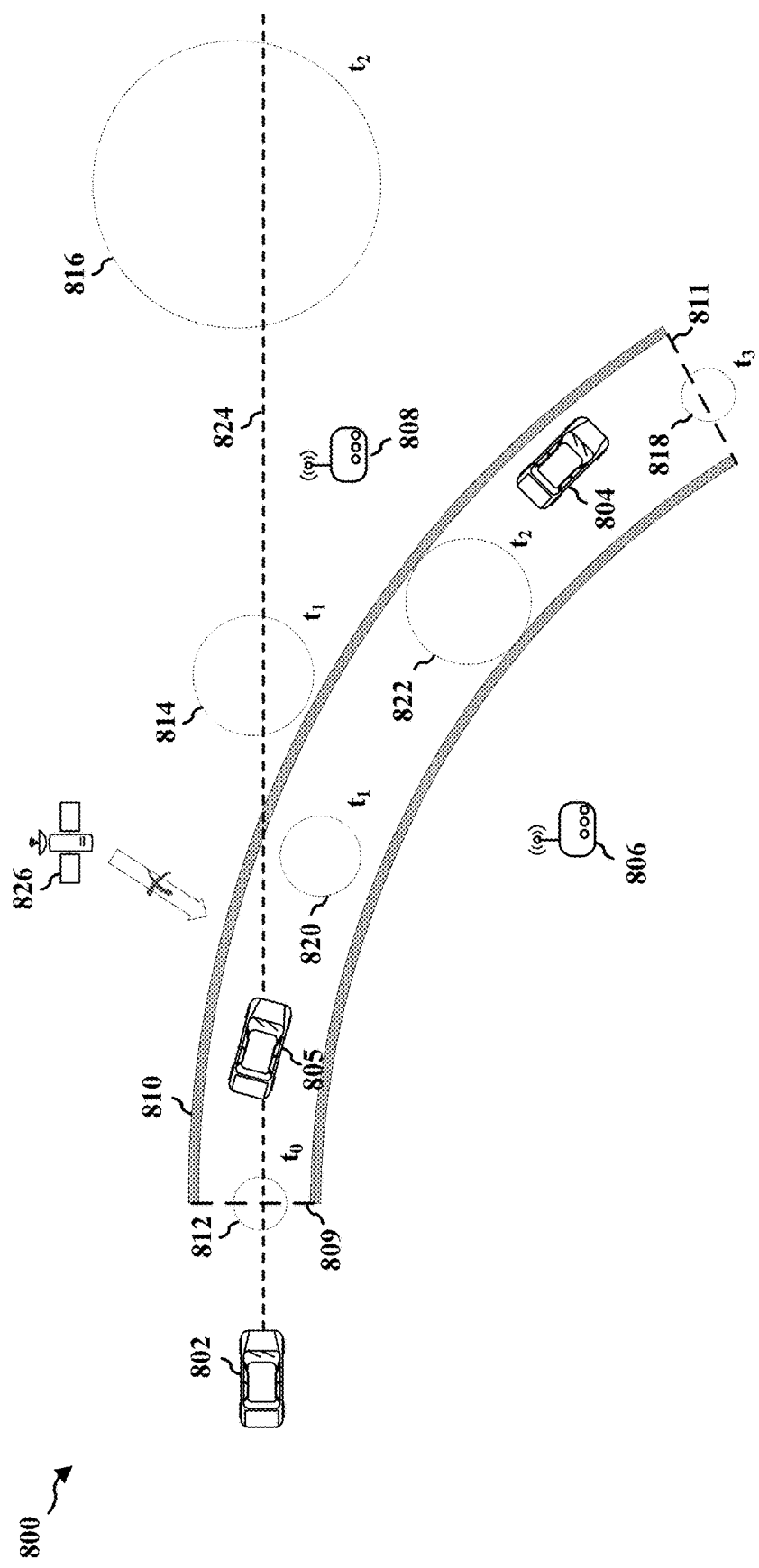
FIG. 8 is a diagram illustrating examples of a UE traveling into an area that lacks beacon signal reception, in accordance with aspects presented herein.

FIG. 8 is a diagram 800 illustrating a UE 802 that may travel into an area where the UE 802 may lack reception of a beacon signal from a wireless device that generates beacon signals, such as a TRP or a GNSS device 826. Such wireless devices may be referred to as long-range (LR) beacon devices. LR beacon devices may include, for example, GNSS devices, GPS devices, NTN devices, low-earth orbit (LEO) devices, or network TRPs. A beacon signal is a positioning signal that may be transmitted to a UE, which the UE may use to determine its position. The UE 802 may be configured to periodically calculate its position using a set of beacon signals received from a set of GNSS devices, such as GNSS device 826, by periodically performing a GNSS fix. When the UE 802 enters an area where the UE 802 lacks reception of one or more beacon signals (e.g., a parking lot, a garage, a tunnel), or enters an area with less visibility of LR beacon devices (e.g., a cliffside, an alley, a side of a building), the UE 802 may fail at performing positioning based on beacon signals received from the LR beacon devices. For example, the UE 802 may enter a tunnel 810. When the UE 802 enters the entrance 809 of the tunnel 810 at $t_0$, the UE 802 may be able to perform a GNSS fix via a beacon signal received from the GNSS device 826. When the UE 802 leaves the exit 811 of the tunnel 810 at $t_3$, the UE 802 may be able to perform a GNSS fix via another beacon signal received from the GNSS device 826. Between the times $t_0$ and $t_3$, the UE 802 may be within the tunnel 810 and may be unable to perform a GNSS fix. In other words, between the times $t_0$ and $t_3$, the UE 802 may be unable to receive any beacon signals from the GNSS device 826.

While the UE 802 is unable to perform a GNSS fix, the UE 802 may be configured to inflate a PUNC value using a pre-defined uncertainty growth model. A PUNC value may be a value that the UE 802 uses to calculate a certainty of its position. A larger PUNC value may represent a greater amount of uncertainty, and a smaller PUNC value may represent a smaller amount of uncertainty. In one aspect, in response to the UE 802 lacking reception of a beacon signal from a set of GNSS devices within a threshold period of time, the UE 802 may be configured to increase a PUNC value linearly for a first time period, exponentially for a second time period, and quadratically for a third time period. In some aspects, growth of the PUNC value may be expressed in terms of meters per second (m/s). For example, growth of a PUNC value may max out at 250 m/s, which represents an uncertainty of 250 meters for every second that the UE is unable to perform a GNSS fix. In some aspects, the PUNC value may be expressed in terms of meters. For example, a PUNC value may max out at 500 meters from a known fixed location of an RSU.

The UE 802 may use the PUNC value to perform a GNSS fix when the UE 802 leaves the exit 811 of the tunnel 810 at time $t_3$. For example, in response to the PUNC value being below or equal to a threshold value, the UE 802 may use an optimized GNSS fix algorithm that uses the last known GNSS position to reduce calculations performed in a GNSS fix, and in response to the PUNC value being equal to or above the threshold value, the UE 802 may use a non-optimized GNSS fix algorithm that does not use the last known GNSS position to reduce calculations performed in a GNSS fix. In some aspects, a larger PUNC value may result in a larger search window for the UE 802 to perform measurements using beacon signals from GNSS SVs, which may result in a higher time to first fix (TTFF) when the UE 802 may receive beacon signals again. The larger search window may use more power. In other words, the longer the UE 802 is in an area that lacks reception of one or more beacon signals, the more power the UE 802 may use to perform a GNSS fix when it is able to receive beacon signals, as the acquisition power may increase with the growth of the PUNC value.

In one aspect, at time to, the UE 802 may perform positioning using a set of beacon signals (e.g., perform a GNSS fix). Since the UE 802 is able to receive beacon signals, the UE 802 may calculate its position to be at the position 812 with a minimally low PUNC value. The radius of the position 812 may represent the PUNC value of the calculated position. When the UE 802 enters the entrance of the tunnel 810, the UE 802 may lose reception of beacon signals, increasing its PUNC value. The UE 802 may assume that it continues to travel along the path 824. At time $t_1$, the UE 802 may be unable to receive any beacon signals, and may estimate a position of the UE 802 to be at position 814. The radius of the position 814 may represent a larger PUNC value than the PUNC value of the position 812. At time $t_2$, the UE 802 may still be unable to receive any beacon signals, and may estimate a position of the UE 802 to be at position 816. The radius of the position 816 may represent an exponentially larger PUNC value than the PUNC value of the position 814. At time $t_3$, the UE 802 may be able to receive beacon signals as it leaves the exit 811 of the tunnel 810. The UE 802 may perform positioning using the set of beacon signals, and its previously calculated position at position 816. It may calculate its new position at position 818 with a minimally low PUNC value. However, since the UE 802 performs positioning using its previously calculated position at position 816 with a large PUNC value, it may take the UE 802 a long time to perform positioning (e.g., a GNSS fix) due to the estimated inaccuracies.

Estimating a position of the UE 802 more accurately may constrain growth of the PUNC value, which may decrease the resources used by the UE 802 in performing positioning when the UE 802 is able to receive beacon signals after a period of non-reception. This may result in a faster time to converge for a GNSS fix. This may result in less power consumption. This may result in an optimal acquisition task allocation. When the UE 802 is able to perform a GNSS fix after an extended period of being unable to receive beacon signals, the UE 802 may be able to perform a better and faster estimate of its location if its PUNC value is smaller. The UE 802 may then transmit its vehicle location to other vehicles via a basic safety message (BSM), improving the safety of vehicles around the UE 802. In order to properly constrain the growth of a PUNC value associated with the UE 802 when the UE 802 lacks reception of one or more beacon signals, the UE 802 may infer a C-V2X Geopolygon or a Geofence breach to model a constrained PUNC value.

The UE 802 may be configured to receive a first set of beacon signals from a set of GNSS devices. The UE 802 may be configured to restrict growth of a PUNC value associated with the first UE based on a maximum vehicle speed and based on a lack of a reception of a beacon signal from the set of GNSS devices within a threshold period of time.

In response to the UE 802 entering an area where it lacks reception of a beacon signal (e.g., a GNSS denied environment), the UE 802 may restrict the growth of its PUNC value to a maximum vehicle speed. The UE 802 may obtain the maximum vehicle speed in a plurality of ways, for example the UE 802 may communicate with the vehicle to obtain a maximum vehicle speed, the UE 802 may obtain the maximum vehicle speed from an odometer of the vehicle in real-time, or the UE 802 may communicate with a real-time traffic database (e.g., a traffic server, an RSU that tracks speeds of a set of UEs associated with vehicles) to obtain a maximum vehicle speed. In one aspect, the UE 802 may be associated with a vehicle that has a maximum speed of 80 m/s. The UE 802 may then limit the growth of its PUNC value to a maximum of 80 m/s when it enters the entrance 809 of the tunnel 810.

In some aspects, the UE 802 may construct a relative velocity profile to further restrict the growth of its PUNC value. For example, the UE 802 may scan for fixed RSUs and/or nearby vehicle BSMs. In some aspects, the RSU 806 and/or the RSU 808 may broadcast their own beacon signals, which the UE 802 may receive. The beacon signals from the RSU 806 and/or the RSU 808 may include an RSU identifier (ID), an indicator of the RSU's location, and/or an indicator of an amount of power that the RSU used to transmit the beacon signal. The UE 802 may construct its relative velocity profile based on one or more beacon signals received from the RSU 806 and/or the RSU 808. The UE 802 may measure a reference signal strength indicator (RSSI) of the beacon signal received from an RSU. The UE 802 may use the RSSI to estimate a distance that the UE 802 is from the RSU. The UE 802 may use a calculated distance from an RSU to calculate a relative velocity profile of the UE 802. In some aspects, the UE 802 may use a calculated distance from a plurality of RSUs, such as the calculated distance from the RSU 806 and the calculated distance from the RSU 808, to triangulate its position to better calculate its relative velocity profile.

In some aspects, the UE 804 and/or the UE 805 may broadcast their own BSMs, which the UE 802 may receive. The BSMs from the UE 804 and/or the UE 805 may include at least a portion of their own relative velocity profiles, such as an indicator of the UE's speed or an indicator of the UE's position. The UE 802 may construct its relative velocity profile based on one or more velocity profiles received from the UE 804 and/or the UE 805. The UE 802 may use one or more velocity profiles to calculate its own relative velocity profile.

In some aspects, the UE 802 may use a road map of an area associated with the position of the UE 802 to correct a calculated position of the UE 802, or to calculate its relative velocity profile. For example, the UE 802 may use a road map of the tunnel 810 to collapse the PUNC value along the path of the tunnel 810, with the understanding that the UE 802 will not travel at high speeds through the walls of the tunnel 810. By collapsing the PUNC value along the path of the tunnel 810, the UE 802 may further restrict the growth of the PUNC value while the UE 802 is unable to perform a GNSS fix.

In another aspect, at time to, the UE 802 may perform positioning using a set of beacon signals received from a set of LR beacon devices (e.g., perform a GNSS fix). Since the UE 802 is able to receive beacon signals from the set of LR beacon devices, the UE 802 may calculate its position to be at the position 812 with a minimally low PUNC value. The radius of the position 812 may represent the PUNC value of the calculated position. When the UE 802 enters the entrance of the tunnel 810, the UE 802 may lose reception of beacon signals, increasing its PUNC value. The UE 802 may constrain growth of its PUNC value based on a maximum vehicle speed of a vehicle associated with the UE 802. For example, the UE 802 may be a mobile device paired with a type of vehicle that has a maximum vehicle speed, or the UE 802 may be a vehicle that has a maximum vehicle speed. The UE 802 may obtain the maximum vehicle speed in a plurality of ways, for example by connecting to an odometer of the vehicle and downloading a maximum vehicle speed, by determining a type of vehicle associated with the UE 802 and downloading a maximum vehicle speed from an online database that associates types of vehicles with maximum vehicle speeds, or by connecting to a real-time traffic database associated with the UE 802 (e.g., a real-time traffic database for the road that the UE 802 is currently traveling on) and downloading a maximum vehicle speed from the real-time traffic database. The UE 802 may constrain growth of its PUNC value by the maximum vehicle speed of the vehicle associated with the UE 802. For example, if the maximum vehicle speed is 50 m/s, the UE 802 may constrain growth of its PUNC value to a maximum of 50 m/s.

The UE 802 may assume that it continues to travel along the path of the tunnel 810, further constraining the estimated location of the UE 802 to be along the path of the tunnel 810. At time $t_1$, the UE 802 may be unable to receive any beacon signals from a set of LR beacon devices, such as GNSS devices. However, the UE 802 may receive beacon signals from a set of SR beacon devices, such as the RSU 806 and the RSU 808. The UE 802 may also receive BSMs from the UE 804 and the UE 805. The BSMs may also be considered beacon signals. In other words, the RSU 806, the RSU 808, the UE 804, and the UE 805 may all be considered SR beacon devices that may transmit beacon signals to the UE 802.

The UE 802 may construct a relative velocity profile using one or more of the known path of the tunnel, the beacon signals from the RSU 806, the beacon signals from the RSU 808, the BSMs from the UE 804 or the BSMs from the UE 805. The UE 802 may calculate its position relative to the RSU 806 or the RSU 808 based on positioning and a known location of the RSU 806 and/or the RSU 808. For example, the UE 802 may estimate its distance from the RSU 806 based on a calculated RTT between transmitting a signal to the RSU 806 and receiving a signal from the RSU 806. In another example, the UE 802 may estimate its distance from the RSU 806 based on a beacon signal periodically transmitted by the RSU 806 including an indication of a location of the RSU 806 and a time-stamp of when the RSU 806 transmitted the beacon signal. The UE 802 may calculate its velocity based on its calculated position relative to the RSU 806 and/or its calculated position relative to the RSU 808. The UE 802 may calculate its position relative to the UE 805 or the UE 804 based upon a set of BSMs received from the UEs 805 and 804. For example, a BSM may include a velocity of the UE, and the UE 802 may calculate a distance between the UE 802 and the UE 805 based on a strength of the BSM (e.g., an RSSI), or based on a RTT between the UE 802 transmitting a signal to the UE 805 and the UE 805 transmitting a signal in response to the UE 802. Based on the calculated velocity of the UE 805 at two different time periods, and a distance between the UE 802 and the UE 805 at those same two different time periods, the UE 802 may be able to estimate its own velocity. The calculated velocity may be used to restrict growth of a PUNC value associated with the UE 802.

The UE 802 may estimate a position of the UE 802 to be at position 820 at time $t_1$. The radius of the position 820 may represent a larger PUNC value than the PUNC value of the position 812, but may represent a smaller PUNC value than the PUNC value of the position 814. At time $t_2$, the UE 802 may still be unable to receive beacon signals from the set of LR beacon devices (e.g., GNSS SVs). However, again, the UE 802 may receive beacon signals from a set of SR beacon devices, such as the RSU 806 and the RSU 808 (or from another set of RSUs), or from the UE 804 and the UE 805 (or from another set of UEs). The UE 802 may construct a relative velocity profile using one or more of the known path of the tunnel, the beacon signals from the RSU 806 or the RSU 808, or the BSMs from the UE 804 or the UE 805, and may estimate a position of the UE 802 to be at position 822 at time $t_2$. The radius of the position 822 may represent a larger PUNC value than the PUNC value of the position 820, but may be smaller than the PUNC value at the position 816. The radius of the PUNC value of at the position 822 may be limited by the walls of the tunnel 810, as the UE 802 may not travel rapidly through the walls of the tunnel 810.

At time $t_3$, the UE 802 may be able to receive beacon signals from the set of LR beacon devices as it leaves the exit 811 of the tunnel 810. The UE 802 may perform positioning using the set of beacon signals received from the set of LR beacon devices (e.g., a GNSS fix), and its previously calculated position at position 822. It may calculate its new position at position 818 with a minimally low PUNC value based on a maximum velocity of the UE 802, and/or a calculated relative velocity profile based on beacon signals received from SR beacon devices, such as the RSU 806, the RSU 808, the UE 805, and/or the UE 804. Since the UE 802 performs positioning using its previously calculated position at position 822 with a smaller PUNC value than the PUNC value associated with position 816, the UE 802 may use less resources to perform positioning (e.g., a GNSS fix) due to the smaller PUNC value.

Figure 9:
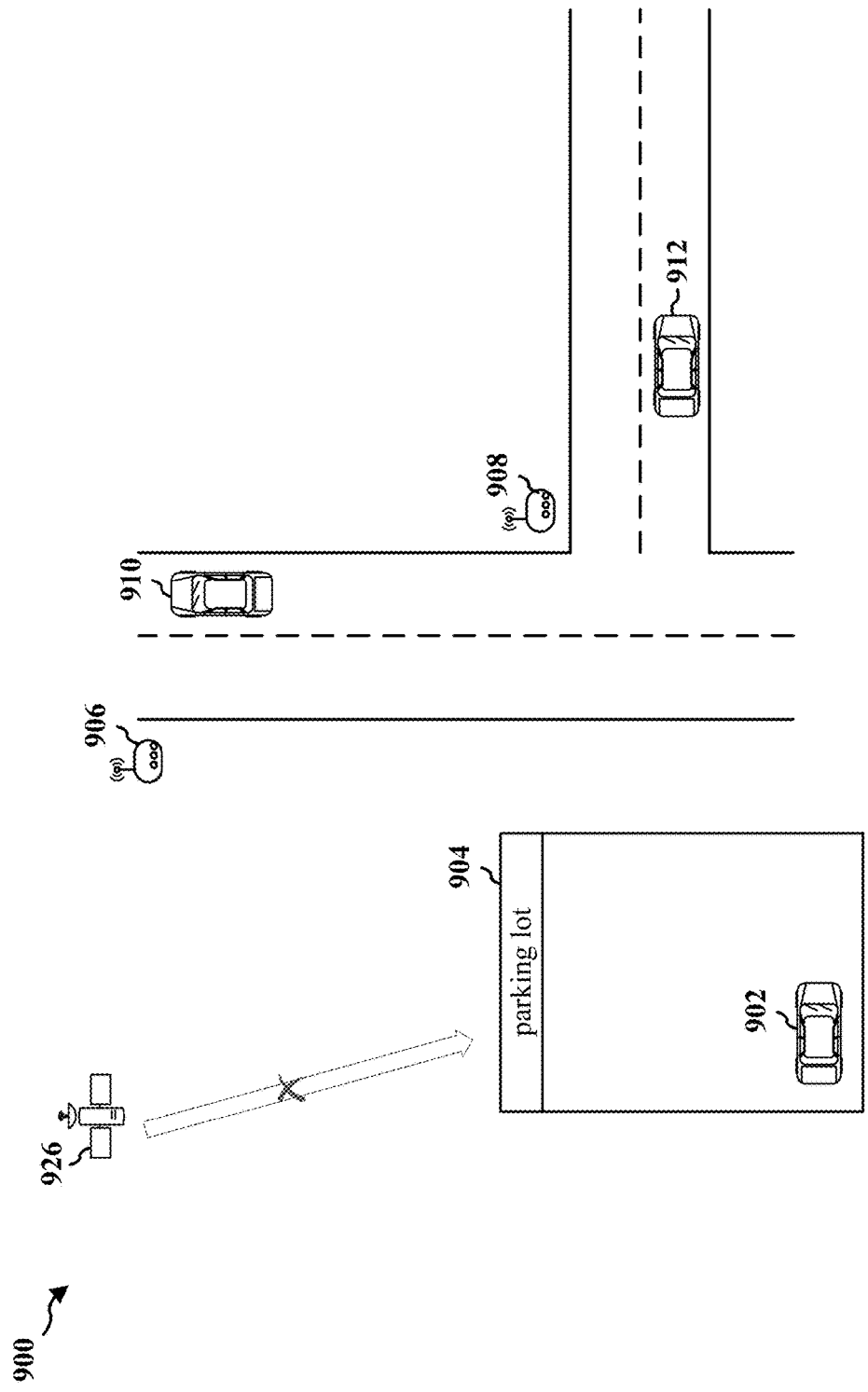
FIG. 9 is a diagram illustrating additional examples of a UE traveling into an area that lacks beacon signal reception, in accordance with aspects presented herein.

FIG. 9 is a diagram 900 illustrating an example of a UE 902 that may travel into an area where the UE 902 may lack reception of a beacon signal from a LR beacon device, such as the GNSS device 926, for an extended period of time (e.g., hours). While the UE 902 is in GNSS coverage mode (can still receive beacon signals from GNSS devices), the UE 902 may save additional information to its position, such as the IDs of visible RSUs, RSU RSSI measurement information, or the last successful GNSS fix position. In response to a change in the state of the UE 902, the UE 902 may switch to a C-V2X active in SLSS mode state. For example, the UE 902 may switch to a C-V2X active in SLSS mode in response to the UE 902 switching to a vehicle immobilization state, such as a parked mode, a vehicle ignition off mode, or a brake applied mode. In such a state, the UE 902 may consider the maximum vehicle speed of the vehicle associated with the UE 902 to be 0 m/s. In other words, the UE 902 may freeze its PUNC value in response to the UE 902 detecting that the vehicle associated with the UE 902 switched to a vehicle immobilization state, and may unfreeze its PUNC value in response to the UE 902 detecting that the vehicle associated with the UE 902 switched from the vehicle immobilization state to a mobilized state.

In response to the UE 902 entering a GNSS denied environment, such as the parking lot 904, the UE 902 may scan for fixed RSUs, such as the RSU 906 or the RSU 908. The UE 902 may check if the RSU IDs associated with the beacon signals from the RSUs overlap with the previously saved RSU IDs, and may compare the strength of the measured beacon signals with the previously saved RSSIs. The UE 902 may use the comparisons to determine if the UE 902 is in near proximity to the last saved GNSS fix position. If the UE 902 determines that the UE 902 is in near proximity to the last saved GNSS fix position, the UE 902 may freeze its PUNC value with a max growth associated with the coverage range of the RSU. For example, in response to the UE 902 receiving a beacon signal from the RSU 908 with an indication that the max coverage range of the RSU 908 is 500 meters, the UE 902 may set the max PUNC value to 500 meters when there is no change to the set of RSUs from which the UE 902 receives beacon signals.

Figure 10:
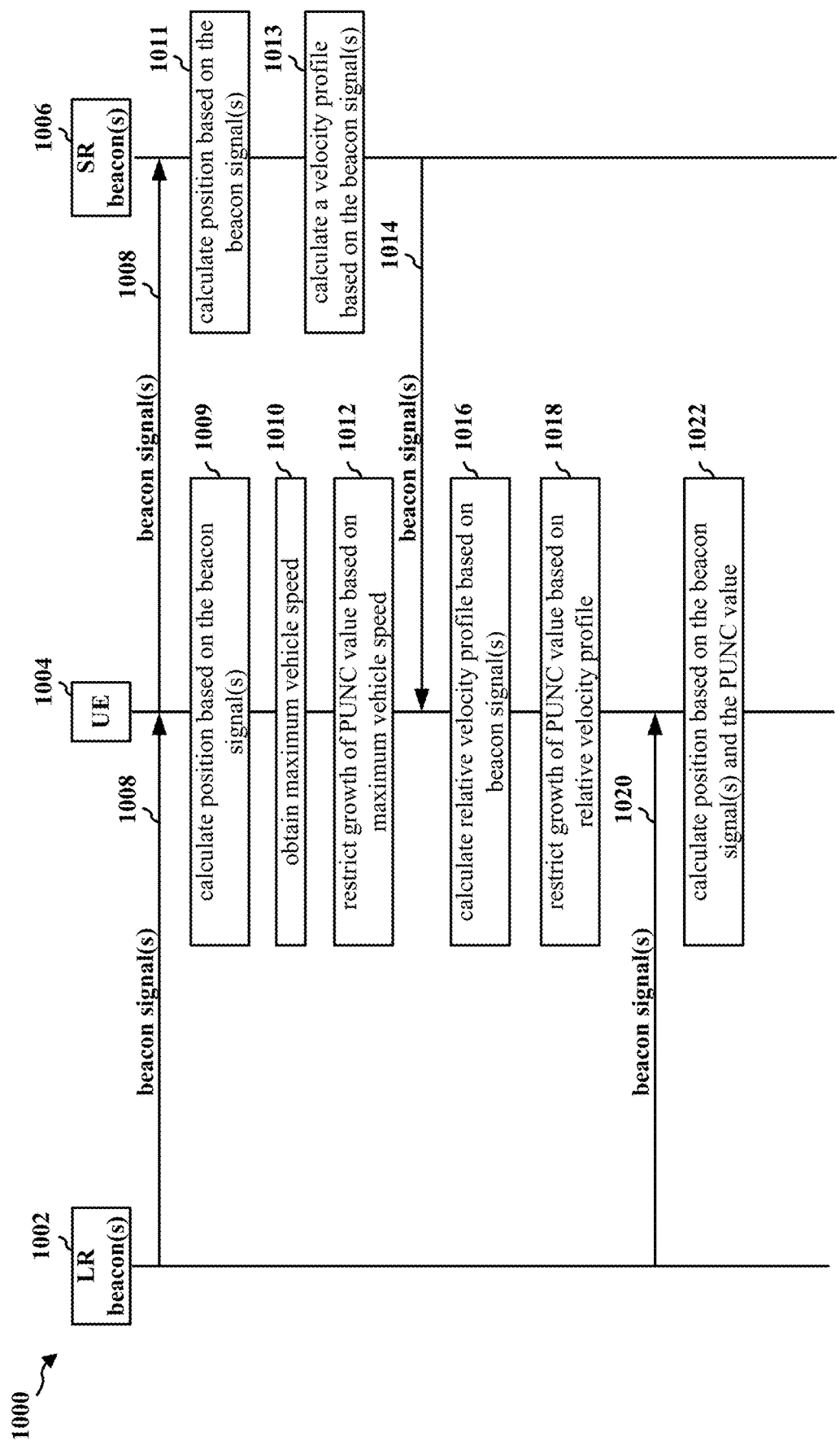
FIG. 10 is a connection flow diagram between a UE and different sets of beacons to assist in managing position uncertainty (PUNC) growth, in accordance with aspects presented herein.

FIG. 10 is a connection flow diagram 1000 between a UE 1004 and a set of SR beacons 1006 configured to assist in managing PUNC growth when the UE 1004 lacks beacon reception from the set of LR beacons 1002. The set of LR beacons 1002 may include, for example, GNSS devices, GPS devices, NTN devices, low-earth orbit (LEO) devices, and/or network TRPs. The set of SR beacons 1006 may include, for example, RSUs and/or UEs. The UE 1004 may be associated with a vehicle. For example, the UE 1004 may be paired with a vehicle capable of movement, or the UE 1004 may include a vehicle capable of movement.

The set of LR beacons 1002 may transmit a set of beacon signals 1008 to the UE 1004. The UE 1004 may receive the set of beacon signals 1008. At 1009, the UE 1004 may calculate a position of the UE 1004 based on the set of beacon signals 1008. For example, the set of beacon signals 1008 may include a set of DL-PRSs from a set of TRPs, which the UE 1004 may use to calculate its position. The set of beacon signals 1008 may include a set of GNSS signals from a set of GNSS devices, which the UE 1004 may use to calculate its position. The UE 1004 may periodically receive the set of beacon signals 1008 from the set of LR beacons 1002, for example in accordance with a transmission schedule of the set of LR beacons 1002. The UE 1004 may periodically calculate its position based upon a schedule of when the UE 1004 receives the set of beacon signals 1008. For example, if the UE 1004 receives the set of beacon signals 1008 every 5 seconds, the UE 1004 may calculate its position every 5 seconds based on the set of beacon signals 1008.

At 1010, the UE 1004 may obtain a maximum vehicle speed. In some aspects, the UE 1004 may obtain a maximum vehicle speed directly from a vehicle associated with the UE 1004. In some aspects, if the UE 1004 is paired with a vehicle, the UE 1004 may transmit a query to the vehicle requesting a maximum vehicle speed. In response, the vehicle may transmit a response to the UE 1004 including an indication of the maximum vehicle speed. In some aspects, if the UE 1004 includes a vehicle, the UE 1004 may retrieve a maximum vehicle speed from a memory of the UE 1004. In some aspects, the vehicle may include an odometer that the UE 1004 may access. The UE 1004 may retrieve a speed of the vehicle in real-time, allowing the UE 1004 to adjust a maximum PUNC value growth based on the real-time odometer readings of the vehicle.

In some aspects, the UE 1004 may obtain a maximum vehicle speed indirectly from a database that includes maximum vehicle speeds. For example, the UE 1004 may have access to a database that associates vehicle types with maximum vehicle speeds. The UE 1004 may transmit a query to the vehicle requesting an indicator of the vehicle's type, such as a make or model. The UE 1004 may request a maximum vehicle speed from the database based on the make and model of the vehicle. In some aspects, the UE 1004 may obtain a maximum vehicle speed indirectly from a database that includes vehicle speeds of vehicles in an area associated with the UE 1004. For example, the UE 1004 may calculate its position based on the set of beacon signals 1008 received from the set of LR beacons 1002. The calculated position may indicate that the UE 1004 is in an area, such as a road having traffic. The UE 1004 may transmit a request to a real-time traffic database for a maximum vehicle speed associated with the calculated position of the UE 1004.

The UE 1004 may stop receiving the set of beacon signals 1008 from the set of LR beacons 1002. For example, the UE 1004 may enter an area where such beacon signals are blocked. The UE 1004 may calculate a PUNC value based on its lack of reception of the set of beacon signals 1008. The PUNC value may increase over time.

At 1012, the UE 1004 may restrict the growth of the PUNC value based on a maximum vehicle speed of the vehicle associated with the UE 1004. For example, if the maximum vehicle speed is 50 m/s, the UE 1004 may restrict the growth of the PUNC value to a maximum growth of 50 m/s. In some aspects, the UE 1004 may determine that the vehicle associated with the UE 1004 is in an immobilization state at 1010. The vehicle may indicate a time-stamp associated with when the vehicle switched to the immobilization state (e.g., when a driver applied a parking brake of the vehicle). In response, the UE 1004 may freeze the PUNC value at the time when the vehicle reports that it switched to the immobilization state.

The set of SR beacons 1006 may transmit a set of beacon signals 1014 to the UE 1004. The UE 1004 may receive the set of beacon signals 1014. The set of beacon signals 1014 may be transmitted in a plurality of ways, for example via sidelink, via a C-V2X message, or a C-V2X sidelink synchronization signal (SLSS). In some aspects, the set of SR beacons 1006 may broadcast the set of beacon signals 1014. In other aspects, the set of SR beacons 1006 may transmit the set of beacon signals 1014 designated the UE 1004 as a recipient. The set of SR beacons 1006 may be configured to periodically transmit the set of beacon signals 1014. In one aspect, the set of SR beacons 1006 may include a set of RSUs configured to periodically broadcast beacon signals which the UE 1004 may use to calculate its position relative to the broadcasting RSU. In one aspect, the set of SR beacons 1006 may include a set of UEs configured to periodically transmit a BSM which the UE 1004 may use to calculate its position relative to the broadcasting UE. The set of beacon signals 1014 may include, for example, an RSU ID, an indicator of a location of the RSU, or an indication of a transmission power associated with one of the set of beacon signals 1014.

At 1016, the UE 1004 may calculate a relative velocity profile based on the set of beacon signals 1014. For example, the UE 1004 may calculate its position from one or more RSUs based on an RSSI of each beacon signal and each RSU's broadcasted location. The UE 1004 may calculate its velocity based on its calculated position at one time and its calculated position at another time. In another aspect, the UE 1004 may calculate its distance from one or more UEs based on an RSSI of each BSM, and may calculate its relative velocity compared to the UEs based on its calculated distance from the UEs at one time and its calculated distance from the UEs at another time. In some aspects, the transmitting UE may have received the set of beacon signals 1008, and may be configured to transmit beacon signals to the UE 1004 in response to a lack of reception of the set of beacon signals 1008 for a threshold period of time, for example 10 seconds. A BSM may include an indication of the transmitting UE's speed, which the UE 1004 may use to estimate its own speed based on the speed of the transmitting UE and the relative velocity of the UE 1004 compared to the transmitting UE. A BSM may include an indication of the transmitting UE's position, which the UE 1004 may use to estimate its own position based on the position of the transmitting UE and an estimated distance between the transmitting UE and the UE 1004 (e.g., based on the measured RSSI of the beacon signal). The transmitting UE may be similar to the UE 1004 in that it may calculate its own relative velocity based on beacon signals received from a set of LR beacons (e.g., GNSS devices) and/or beacon signals received from a set of SR beacons (e.g., RSUs or UEs). For example, at 1011, a set of UEs of the set of SR beacons 1006 may calculate its position based on the set of beacon signals 1008 received from the set of LR beacons 1002 or a set of beacon signals received from RSUs or other UEs. At 1013, a set of UEs of the set of SR beacons 1006 may calculate their own relative velocity profile based on the set of beacon signals 1008 or a set of beacon signals received from RSUs or other UEs. As one or more of the set of UEs of the set of SR beacons 1006 may receive more or additional beacon signals from other beacon devices (e.g., the UE may have a LOS to a set of LR beacons in orbit around the Earth, and may have a LOS to the UE 1004 through an opening of a tunnel, but the UE 1004 may not have a LOS to the set of LR beacons as the UE 1004 may be in the tunnel). The UE may transmit a portion of its calculated relative velocity profile. For example, the UE may calculate its position, velocity, acceleration, and projected path, but may transmit its position and velocity to the UE 1004. An RSU of the set of SR beacons 1006 may not calculate its position at 1011 or calculate a relative velocity profile at 1013 as it may be fixed in place and may have a known position.

In some aspects, the UE 1004 may calculate the relative velocity profile based on map aiding information, such as a projected route of the UE 1004, for example a projected route on a mapping software or a projected route if the UE 1004 lost reception of the set of beacon signals 1008 while the UE 1004 is on a single path, such as a tunnel or a bridge. In some aspects, the UE 1004 may correct its calculated position based on a road map. For example, the UE 1004 may estimate that it may have traveled a minimum and a maximum distance from its last known position, and may narrow its estimated position to be along the road of its projected path in accordance with the estimated minimum and maximum distances from its last known position.

At 1018, the UE 1004 may restrict growth of the PUNC value based on the relative velocity profile. In some aspects, the UE 1004 may restrict growth of the PUNC value by a calculated velocity of the UE 1004. In some aspects, the UE 1004 may restrict growth of the PUNC value to match a projected route of the UE 1004 based on the position of the UE 1004 calculated at 1009. In some aspects, the UE 1004 may calculate its position from an RSU with a known location, and may restrict the PUNC value to ensure that the estimated position of the UE 1004 is within a reception range of the transmitting RSU. In some aspects, the UE 1004 may determine that the vehicle associated with the UE 1004 is in an immobilization state. In response, the UE 1004 may freeze the PUNC value.

The set of LR beacons 1002 may transmit a set of beacon signals 1020 to the UE 1004. The UE 1004 may receive the set of beacon signals 1020. The UE 1004 may receive the set of beacon signals 1020 in response to moving to an area with better reception, for example out of a tunnel or out of a parking garage. At 1022, the UE 1004 may calculate a position of the UE 1004 based on the set of beacon signals 1020 and the PUNC value. The UE 1004 may select a positioning algorithm based on the PUNC value. For example, the UE 1004 may select a more complicated positioning algorithm based on a large PUNC value (e.g., calculating a position from scratch), or the UE may select a simpler positioning algorithm based on a smaller PUNC value (e.g., calculating a position based on an estimated position).

Figure 11:
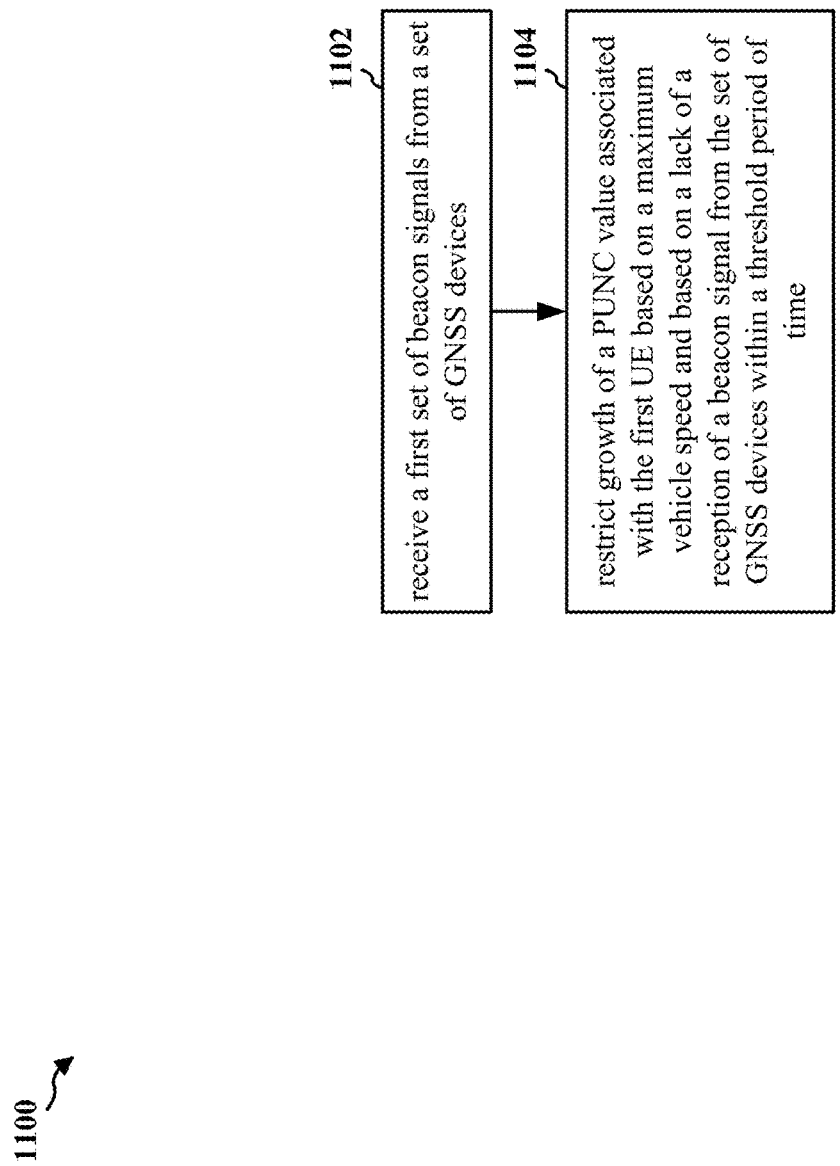
FIG. 11 is a flowchart of a method of wireless communication.

FIG. 11 is a flowchart 1100 of a method of wireless communication. The method may be performed by a first UE (e.g., the UE 104, the UE 350, the UE 404, the UE 602, the UE 604, the UE 606, the UE 608, the UE 802, the UE 804, the UE 805, the UE 902, the UE 910, the UE 912, the UE 1004; the apparatus 1504). At 1102, the first UE may receive a first set of beacon signals from a set of GNSS devices. For example, 1102 may be performed by the UE 1004 in FIG. 10, which may receive the set of beacon signals 1008 from the set of LR beacons 1002, which may be a set of GNSS devices. Moreover, 1102 may be performed by the component 198 in FIG. 1, 3, 6, or 15.

At 1104, the first UE may restrict growth of a PUNC value associated with the first UE based on a maximum vehicle speed and based on a lack of a reception of a beacon signal from the set of GNSS devices within a threshold period of time. For example, 1104 may be performed by the UE 1004 in FIG. 10, which may, at 1012, restrict growth of a PUNC value associated with the UE 1004 based on a maximum vehicle speed of a vehicle associated with the UE 1004 and based on a lack of a reception of the set of beacon signals 1008 from set of LR beacons 1002, which may include a set of GNSS devices, within a threshold period of time. Moreover, 1104 may be performed by the component 198 in FIG. 1, 3, 6, or 15.

Figure 12:
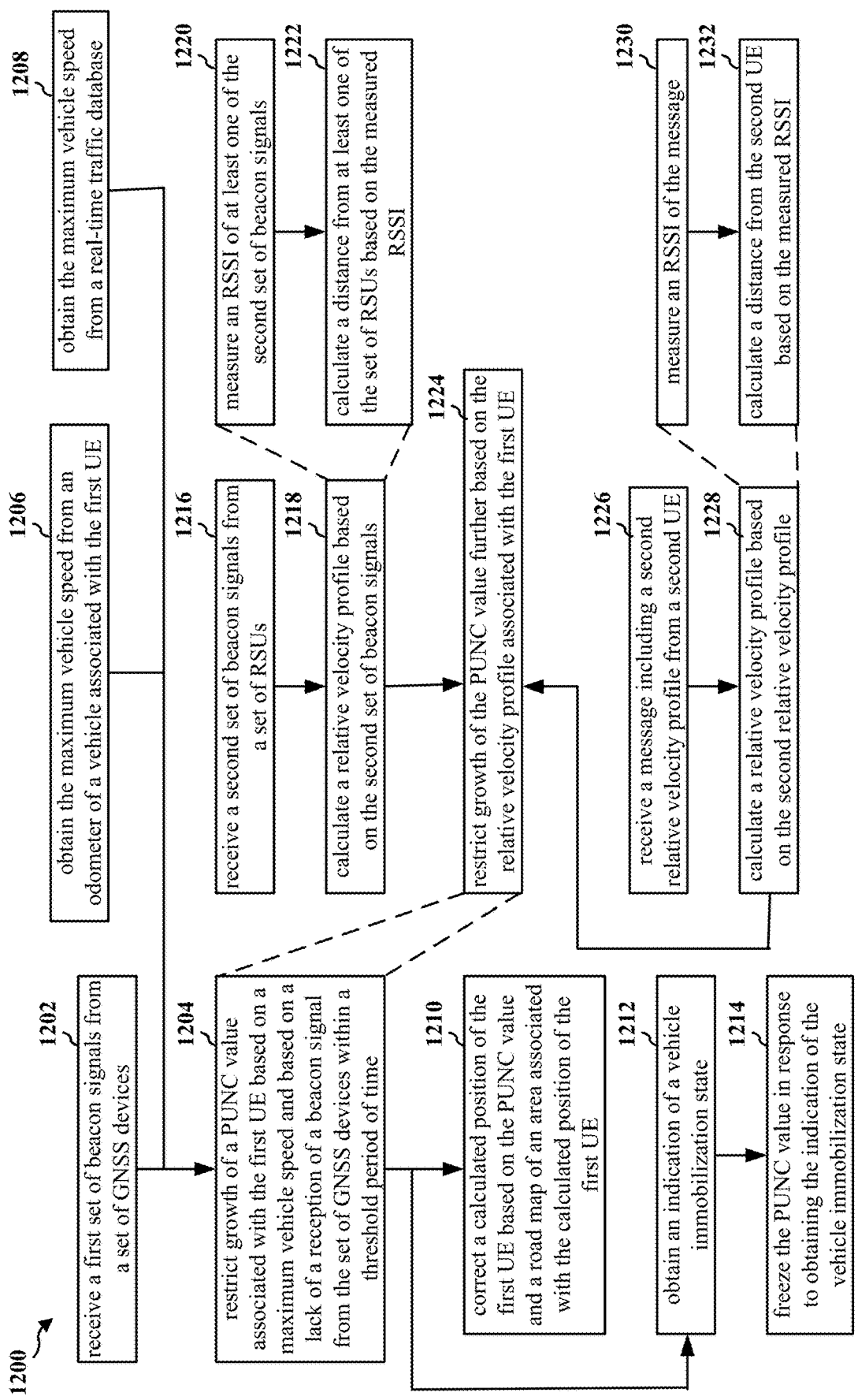
FIG. 12 is a flowchart of a method of wireless communication.

FIG. 12 is a flowchart 1200 of a method of wireless communication. The method may be performed by a first UE (e.g., the UE 104, the UE 350, the UE 404, the UE 602, the UE 604, the UE 606, the UE 608, the UE 802, the UE 804, the UE 805, the UE 902, the UE 910, the UE 912, the UE 1004; the apparatus 1504). At 1202, the first UE may receive a first set of beacon signals from a set of GNSS devices. For example, 1202 may be performed by the UE 1004 in FIG. 10, which may receive the set of beacon signals 1008 from the set of LR beacons 1002, which may be a set of GNSS devices. Moreover, 1202 may be performed by the component 198 in FIG. 1, 3, 6, or 15.

At 1204, the first UE may restrict growth of a PUNC value associated with the first UE based on a maximum vehicle speed and based on a lack of a reception of a beacon signal from the set of GNSS devices within a threshold period of time. For example, 1204 may be performed by the UE 1004 in FIG. 10, which may, at 1012, restrict growth of a PUNC value associated with the UE 1004 based on a maximum vehicle speed of a vehicle associated with the UE 1004 and based on a lack of a reception of the set of beacon signals 1008 from set of LR beacons 1002, which may include a set of GNSS devices, within a threshold period of time. Moreover, 1204 may be performed by the component 198 in FIG. 1, 3, 6, or 15.

At 1206, the first UE may obtain the maximum vehicle speed from an odometer of a vehicle associated with the first UE. For example, 1206 may be performed by the UE 1004 in FIG. 10, which may, at 1010, obtain the maximum vehicle speed from an odometer of a vehicle associated with the UE. 1004 Moreover, 1206 may be performed by the component 198 in FIG. 1, 3, 6, or 15.

At 1208, the first UE may obtain the maximum vehicle speed from a real-time traffic database. For example, 1208 may be performed by the UE 1004 in FIG. 10, which may, at 1010, obtain the maximum vehicle speed from a real-time traffic database, for example based on the position of the UE 1004 calculated at 1009. Moreover, 1208 may be performed by the component 198 in FIG. 1, 3, 6, or 15.

At 1210, the first UE may correct a calculated position of the first UE based on the PUNC value and a road map of an area associated with the calculated position of the first UE. For example, 1210 may be performed by the UE 1004 in FIG. 10, which may, at 1018, correct a calculated position of the first UE based on the PUNC value and a road map of an area associated with the calculated position of the UE 1004 calculated at 1009. Moreover, 1210 may be performed by the component 198 in FIG. 1, 3, 6, or 15.

At 1212, the first UE may obtain an indication of a vehicle immobilization state. For example, 1212 may be performed by the UE 1004 in FIG. 10, which may obtain an indication of a vehicle immobilization state at 1010, for example in response to the vehicle applying a parking brake. Moreover, 1212 may be performed by the component 198 in FIG. 1, 3, 6, or 15.

At 1214, the first UE may freeze the PUNC value in response to obtaining the indication of the vehicle immobilization state. For example, 1214 may be performed by the UE 1004 in FIG. 10, which may, at 1012 or 1018, freeze the PUNC value in response to obtaining the indication of the vehicle immobilization state. Moreover, 1214 may be performed by the component 198 in FIG. 1, 3, 6, or 15.

At 1216, the first UE may receive a second set of beacon signals from a set of RSUs. For example, 1216 may be performed by the UE 1004 in FIG. 10, which may receive a set of beacon signals 1014 from the set of SR beacons 1006, which may include a set of RSUs. Moreover, 1216 may be performed by the component 198 in FIG. 1, 3, 6, or 15.

At 1218, the first UE may calculate a relative velocity profile based on the second set of beacon signals. For example, 1218 may be performed by the UE 1004 in FIG. 10, which may, at 1016, calculate a relative velocity profile based on the set of beacon signals 1014 from the set of SR beacons 1006. Moreover, 1218 may be performed by the component 198 in FIG. 1, 3, 6, or 15.

At 1220, the first UE may measure an RSSI of at least one of the second set of beacon signals. For example, 1220 may be performed by the UE 1004 in FIG. 10, which may measure an RSSI of at least one of the set of beacon signals 1014. Moreover, 1220 may be performed by the component 198 in FIG. 1, 3, 6, or 15.

At 1222, the first UE may calculate a distance from at least one of the set of RSUs based on the measured RSSI. For example, 1222 may be performed by the UE 1004 in FIG. 10, which may calculate a distance from at least one of the set of SR beacons 1006, which may include a set of RSUs, based on the measured RSSI of the set of beacon signals 1014. Moreover, 1222 may be performed by the component 198 in FIG. 1, 3, 6, or 15.

At 1224, the first UE may restrict growth of the PUNC value further based on the relative velocity profile associated with the first UE. For example, 1224 may be performed by the UE 1004 in FIG. 10, which may, at 1018, restrict growth of the PUNC value further based on the relative velocity profile associated with the UE 1004. Moreover, 1224 may be performed by the component 198 in FIG. 1, 3, 6, or 15.

At 1226, the first UE may receive a message including a second relative velocity profile from a second UE. For example, 1226 may be performed by the UE 1004 in FIG. 10, which may receive a set of beacon signals 1014 from the set of SR beacons 1006. The set of beacon signals 1014 may include a BSM, which may be a message including a second relative velocity profile from a UE that is not the UE 1004. Moreover, 1226 may be performed by the component 198 in FIG. 1, 3, 6, or 15.

At 1228, the first UE may calculate a relative velocity profile based on the second relative velocity profile. For example, 1228 may be performed by the UE 1004 in FIG. 10, which may, at 1018, calculate a relative velocity profile based on the second relative velocity profile received in the set of beacon signals 1014. Moreover, 1228 may be performed by the component 198 in FIG. 1, 3, 6, or 15.

At 1230, the first UE may measure an RSSI of the message. For example, 1230 may be performed by the UE 1004 in FIG. 10, which may measure an RSSI of the set of beacon signals 1014, which may include a BSM, which may be a type of message. Moreover, 1230 may be performed by the component 198 in FIG. 1, 3, 6, or 15.

At 1232, the first UE may calculate a distance from the second UE based on the measured RSSI. For example, 1232 may be performed by the UE 1004 in FIG. 10, which may calculate a distance from the set of SR beacons 1006, which may include a UE, based on the measured RSSI of the set of beacon signals 1014. Moreover, 1232 may be performed by the component 198 in FIG. 1, 3, 6, or 15.

Figure 13:
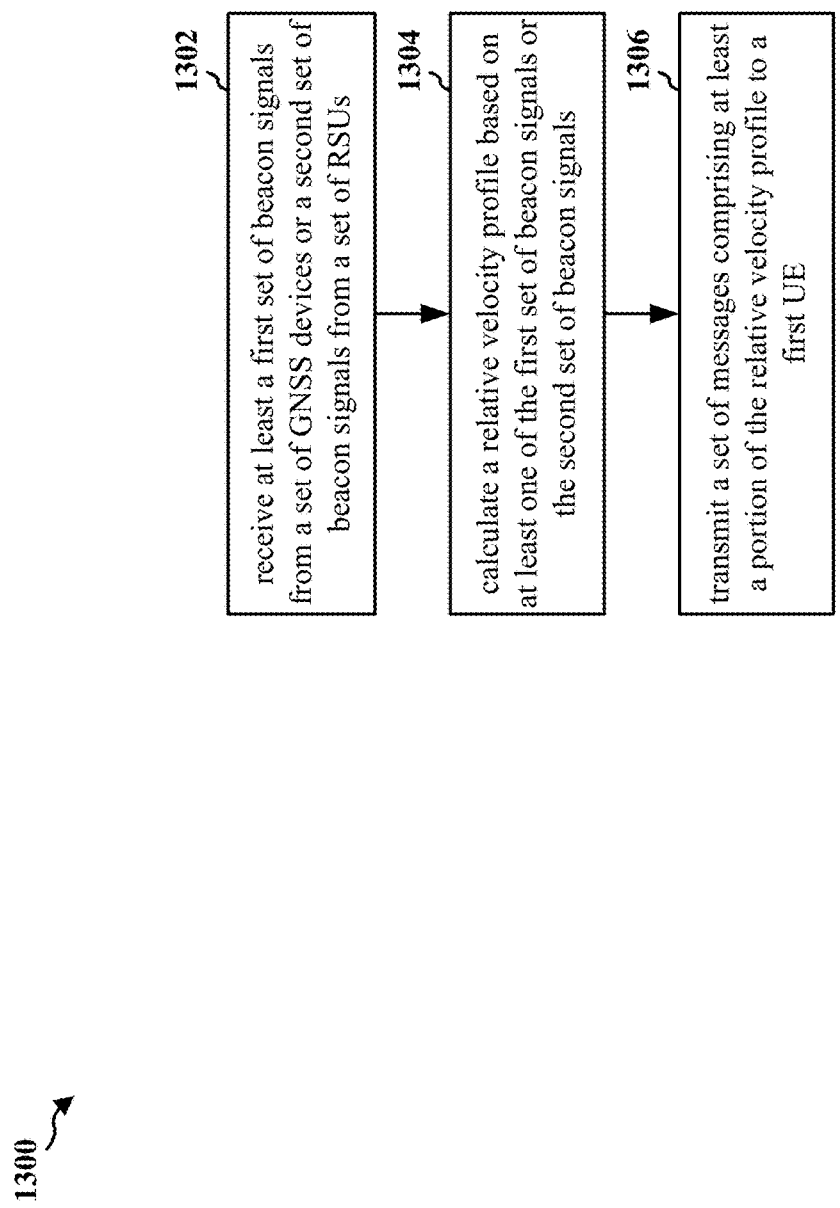
FIG. 13 is a flowchart of a method of wireless communication.

FIG. 13 is a flowchart 1300 of a method of wireless communication. The method may be performed by a second UE (e.g., the UE 104, the UE 350, the UE 404, the UE 602, the UE 604, the UE 606, the UE 608, the UE 802, the UE 804, the UE 805, the UE 902, the UE 910, the UE 912, the UE 1004; the apparatus 1504). At 1302, the second UE may receive at least a first set of beacon signals from a set of GNSS devices or a second set of beacon signals from a set of RSUs. For example, 1302 may be performed by the set of SR beacons 1006 in FIG. 11, which may include a UE, which may receive at least the set of beacon signals 1008 from the set of LR beacons 1002, which may include a set of GNSS devices, or may receive a set of beacon signals from a set of RSUs, which include RSUs of the set of SR beacons 1006. Moreover, 1302 may be performed by the component 199 in FIG. 1, 3, 6, or 15.

At 1304, the second UE may calculate a relative velocity profile based on at least one of the first set of beacon signals or the second set of beacon signals. For example, 1304 may be performed by the set of SR beacons 1006 in FIG. 11, which may include a UE, which may, at 1013, calculate a relative velocity profile based on at least one of the set of beacon signals 1008 received from the set of LR beacons 1002 or a set of beacon signals received from a set of RSUs or a set of other UEs. Moreover, 1304 may be performed by the component 199 in FIG. 1, 3, 6, or 15.

At 1306, the second UE may transmit a set of messages including at least a portion of the relative velocity profile to a first UE. For example, 1306 may be performed by the set of SR beacons 1006 in FIG. 11, which may include a UE, which may transmit a set of beacon signals 1014, which may include a BSM, a type of message, to the UE 1004. The BSM may include at least a portion of the relative velocity profile. Moreover, 1306 may be performed by the component 199 in FIG. 1, 3, 6, or 15.

Figure 14:
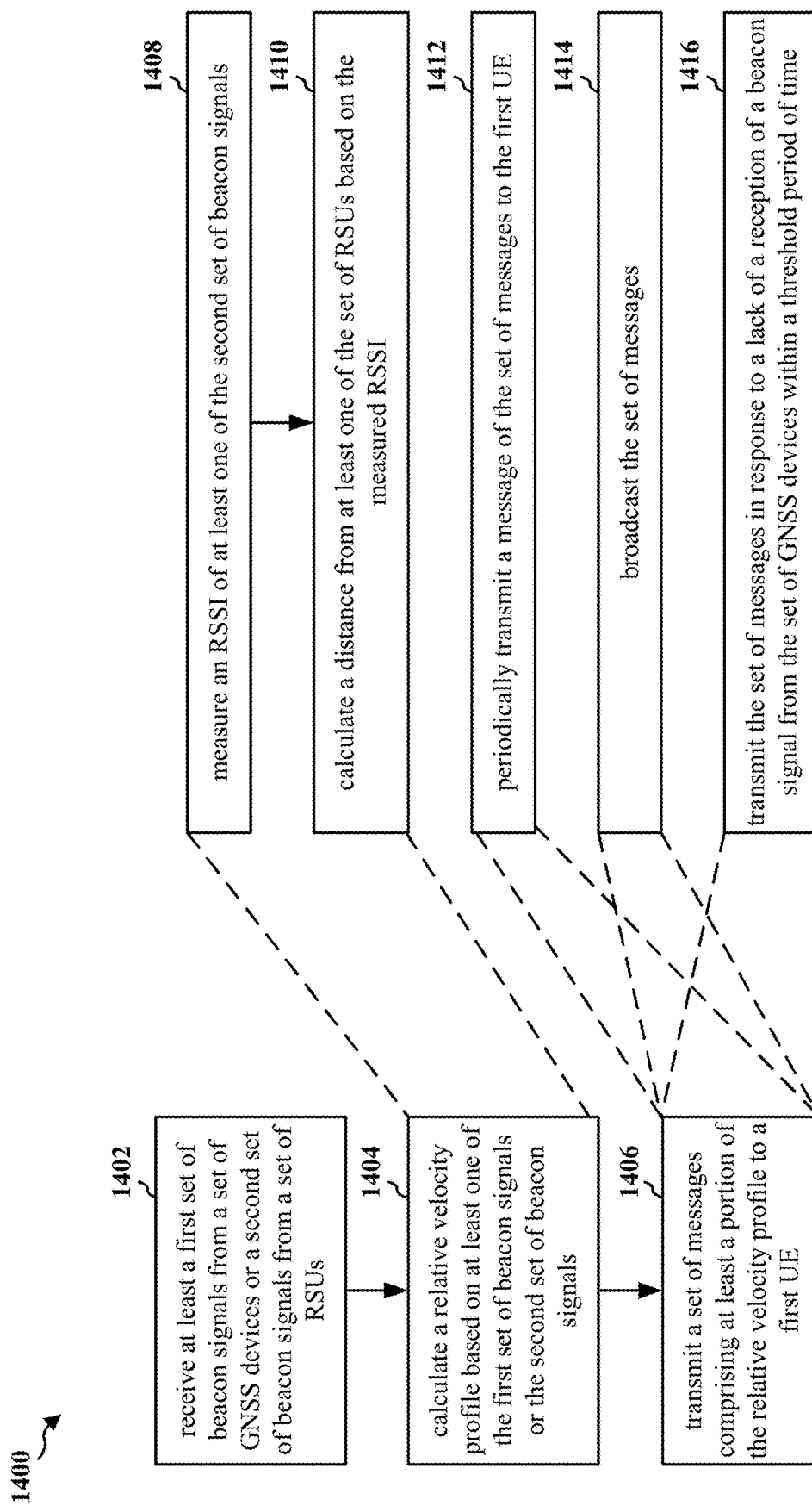
FIG. 14 is a flowchart of a method of wireless communication.

FIG. 14 is a flowchart 1400 of a method of wireless communication. The method may be performed by a second UE (e.g., the UE 104, the UE 350, the UE 404, the UE 602, the UE 604, the UE 606, the UE 608, the UE 802, the UE 804, the UE 805, the UE 902, the UE 910, the UE 912, the UE 1004; the apparatus 1504). At 1402, the second UE may receive at least a first set of beacon signals from a set of GNSS devices or a second set of beacon signals from a set of RSUs. For example, 1402 may be performed by the set of SR beacons 1006 in FIG. 11, which may include a UE, which may receive at least the set of beacon signals 1008 from the set of LR beacons 1002, which may include a set of GNSS devices, or may receive a set of beacon signals from a set of RSUs, which include RSUs of the set of SR beacons 1006. Moreover, 1402 may be performed by the component 199 in FIG. 1, 3, 6, or 15.

At 1404, the second UE may calculate a relative velocity profile based on at least one of the first set of beacon signals or the second set of beacon signals. For example, 1404 may be performed by the set of SR beacons 1006 in FIG. 11, which may include a UE, which may, at 1013, calculate a relative velocity profile based on at least one of the set of beacon signals 1008 received from the set of LR beacons 1002 or a set of beacon signals received from a set of RSUs or a set of other UEs. Moreover, 1404 may be performed by the component 199 in FIG. 1, 3, 6, or 15.

At 1406, the second UE may transmit a set of messages including at least a portion of the relative velocity profile to a first UE. For example, 1406 may be performed by the set of SR beacons 1006 in FIG. 11, which may include a UE, which may transmit a set of beacon signals 1014, which may include a BSM, a type of message, to the UE 1004. The BSM may include at least a portion of the relative velocity profile. Moreover, 1406 may be performed by the component 199 in FIG. 1, 3, 6, or 15.

At 1408, the second UE may measure an RSSI of at least one of the second set of beacon signals. For example, 1408 may be performed by the set of SR beacons 1006 in FIG. 11, which may include a UE, which may measure an RSSI of at least one of the set of beacon signals 1014 transmitted by an RSU or a UE of the set of SR beacons 1006. Moreover, 1408 may be performed by the component 199 in FIG. 1, 3, 6, or 15.

At 1410, the second UE may calculate a distance from at least one of the set of RSUs based on the measured RSSI. For example, 1410 may be performed by the set of SR beacons 1006 in FIG. 11, which may include a UE, which may, at 1013, calculate a distance from at least one of the set of RSUs of the set of SR beacons 1006 based on the measured RSSI. Moreover, 1410 may be performed by the component 199 in FIG. 1, 3, 6, or 15.

At 1412, the second UE may periodically transmit a message of the set of messages to the first UE. For example, 1412 may be performed by the set of SR beacons 1006 in FIG. 11, which may include a UE, which may periodically transmit one of the set of beacon signals 1014 as a BSM to the UE 1004. Moreover, 1412 may be performed by the component 199 in FIG. 1, 3, 6, or 15.

At 1414, the second UE may broadcast the set of messages. For example, 1414 may be performed by the set of SR beacons 1006 in FIG. 11, which may include a UE, which may broadcast at least one of the set of beacon signals 1014 as a broadcast BSM. Moreover, 1414 may be performed by the component 199 in FIG. 1, 3, 6, or 15.

At 1416, the second UE may transmit the set of messages in response to a lack of a reception of a beacon signal from the set of GNSS devices within a threshold period of time. For example, 1416 may be performed by the set of SR beacons 1006 in FIG. 11, which may include a UE, which may transmit at least one of the set of beacon signals 1014 as a BSM in response to a lack of a reception of a beacon signal from the set of LR beacons 1002 within a threshold period of time. Moreover, 1416 may be performed by the component 199 in FIG. 1, 3, 6, or 15.

Figure 15:
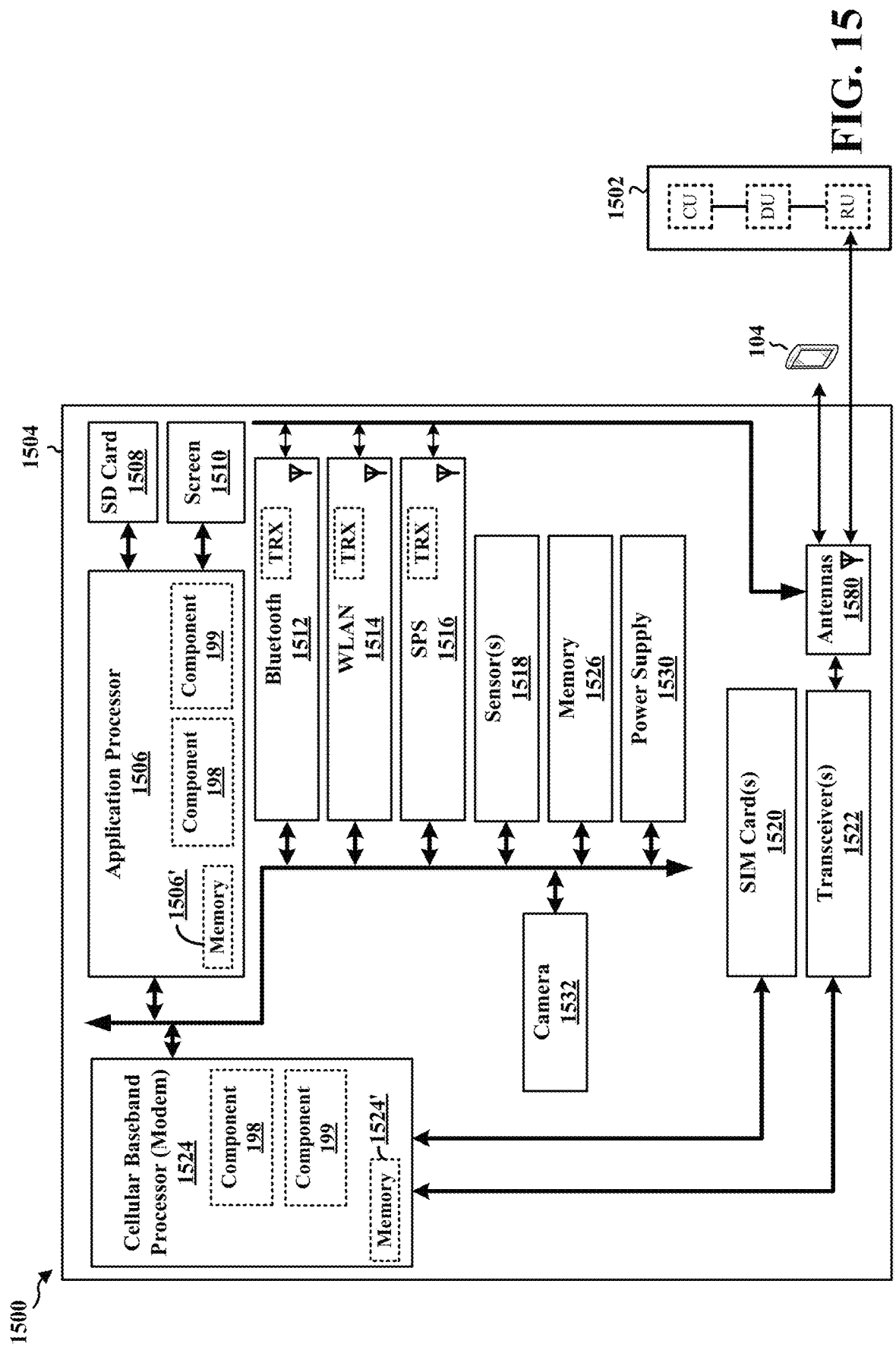
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1404 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 may be configured to receive a first set of beacon signals from a set of GNSS devices. The component 198 may be configured to restrict growth of a PUNC value associated with the UE 104 based on a maximum vehicle speed and based on a lack of a reception of a beacon signal from the set of GNSS devices within a threshold period of time. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for receiving a first set of beacon signals from a set of GNSS devices. The apparatus 1504 may include means for restricting growth of a PUNC value associated with the UE based on a maximum vehicle speed and based on a lack of a reception of a beacon signal from the set of GNSS devices within a threshold period of time. The apparatus 1504 may include means for obtaining the maximum vehicle speed from an odometer of a vehicle associated with the UE. The apparatus 1504 may include means for obtaining the maximum vehicle speed from a real-time traffic database. The apparatus 1504 may include means for restricting growth of the PUNC value further based on a relative velocity profile associated with the UE. The apparatus 1504 may include means for receiving a second set of beacon signals from a set of RSUs. The apparatus 1504 may include means for calculating the relative velocity profile based on the second set of beacon signals. The second set of beacon signals may include at least one of (a) an RSU ID, (b) a first indicator of an RSU location, or (c) a second indicator of a transmission power. The apparatus 1504 may include means for calculating the relative velocity profile based on the second set of beacon signals by measuring an RSSI of at least one of the second set of beacon signals. The apparatus 1504 may include means for calculating the relative velocity profile based on the second set of beacon signals by calculating a distance from at least one of the set of RSUs based on the measured RSSI. The apparatus 1504 may include means for receiving a message including a second relative velocity profile from a second UE. The apparatus 1504 may include means for calculating the relative velocity profile based on the second relative velocity profile. The second relative velocity profile may include at least one of a first indicator of a speed of the second UE or a second indicator of a position of the second UE. The apparatus 1504 may include means for measuring an RSSI of the message. The apparatus 1504 may include means for calculating a distance from the second UE based on the measured RSSI. The message may include a C-V2X SLSS. The apparatus 1504 may include means for correcting a position of the UE based on the PUNC value and a road map of an area associated with the position of the UE. The apparatus 1504 may include means for obtaining an indication of a vehicle immobilization state. The apparatus 1504 may include means for freezing the PUNC value in response to obtaining the indication of the vehicle immobilization state. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to receive at least a first set of beacon signals from a set of GNSS devices or a second set of beacon signals from a set of RSUs. The component 199 may be configured to calculate a relative velocity profile based on at least one of the first set of beacon signals or the second set of beacon signals. The component 199 may be configured to transmit a set of messages including at least a portion of the relative velocity profile to another UE. The component 199 may be within the cellular baseband processor 1524, the application processor 1506, or both the cellular baseband processor 1524 and the application processor 1506. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for receiving at least a first set of beacon signals from a set of GNSS devices or a second set of beacon signals from a set of RSUs. The apparatus 1504 may include means for calculating a relative velocity profile based on at least one of the first set of beacon signals or the second set of beacon signals. The apparatus 1504 may include means for transmitting a set of messages including at least a portion of the relative velocity profile to a first UE. The apparatus 1504 may include means for transmitting the set of messages by periodically transmitting a message of the set of messages to the first UE. The apparatus 1504 may include means for transmitting the set of messages by broadcasting the set of messages. The apparatus 1504 may include means for transmitting the set of messages by transmitting the set of messages in response to a lack of a reception of a beacon signal from the set of GNSS devices within a threshold period of time. The set of messages may include a C-V2X SLSS. The relative velocity profile may include a maximum vehicle speed based on a real-time traffic database. The relative velocity profile may include at least one of a first indicator of a speed of the second UE or a second indicator of a position of the second UE. The second set of beacon signals may include at least one of (a) an RSU ID, (b) a first indicator of an RSU location, or (c) a second indicator of a transmission power. The apparatus 1504 may include means for calculating the relative velocity profile based on the second set of beacon signals by measuring an RSSI of at least one of the second set of beacon signals. The apparatus 1504 may include means for calculating the relative velocity profile based on the second set of beacon signals by calculating a distance from at least one of the set of RSUs based on the measured RSSI. The means may be the component 199 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE, where the method may include receiving a first set of beacon signals from a set of GNSS devices. The method may include restricting growth of a PUNC value associated with the UE based on a maximum vehicle speed and based on a lack of a reception of a beacon signal from the set of GNSS devices within a threshold period of time.

Aspect 2 is the method of aspect 1, where the method may include obtaining the maximum vehicle speed from an odometer of a vehicle associated with the UE.

Aspect 3 is the method of either of aspects 1 or 2, where the method may include obtaining the maximum vehicle speed from a real-time traffic database.

Aspect 4 is the method of any of aspects 1 to 3, where restricting growth of the PUNC value may be further based on a relative velocity profile associated with the UE.

Aspect 5 is the method of aspect 4, where the method may include receiving a second set of beacon signals from a set of RSUs. The method may include calculating the relative velocity profile based on the second set of beacon signals.

Aspect 6 is the method of aspect 5, where the second set of beacon signals may include at least one of (a) an RSU ID, (b) a first indicator of an RSU location, or (c) a second indicator of a transmission power.

Aspect 7 is the method of either of aspects 5 or 6, where calculating the relative velocity profile based on the second set of beacon signals may include measuring an RSSI of at least one of the second set of beacon signals. Calculating the relative velocity profile based on the second set of beacon signals may include calculating a distance from at least one of the set of RSUs based on the measured RSSI.

Aspect 8 is the method of any of aspects 4 to 7, where the method may include receiving a message including a second relative velocity profile from a second UE. The method may include calculating the relative velocity profile based on the second relative velocity profile.

Aspect 9 is the method of any of aspect 8, where the second relative velocity profile may include at least one of a first indicator of a speed of the second UE or a second indicator of a position of the second UE.

Aspect 10 is the method of either of aspects 8 or 9, where the method may include measuring an RSSI of the message. The method may include calculating a distance from the second UE based on the measured RSSI.

Aspect 11 is the method of any of aspects 8 to 10, where the message may include a C-V2X SLSS.

Aspect 12 is the method of any of aspects 1 to 11, where the method may include correcting a calculated position of the UE based on the PUNC value and a road map of an area associated with the calculated position of the UE.

Aspect 13 is the method of any of aspects 1 to 12, where the method may include obtaining an indication of a vehicle immobilization state. The method may include freezing the PUNC value in response to obtaining the indication of the vehicle immobilization state.

Aspect 14 is a method of wireless communication at a second UE, where the method may include receiving at least a first set of beacon signals from a set of GNSS devices or a second set of beacon signals from a set of RSUs. The method may include calculating a relative velocity profile based on at least one of the first set of beacon signals or the second set of beacon signals. The method may include transmitting a set of messages including at least a portion of the relative velocity profile to a first UE.

Aspect 15 is the method of aspect 14, where transmitting the set of messages may include periodically transmitting a message of the set of messages to the first UE.

Aspect 16 is the method of either of aspects 14 or 15, where transmitting the set of messages may include broadcasting the set of messages.

Aspect 17 is the method of any of aspects 14 to 16, transmitting the set of messages may include transmitting the set of messages in response to a lack of a reception of a beacon signal from the set of GNSS devices within a threshold period of time.

Aspect 18 is the method of any of aspects 14 to 17, where the set of messages may include a C-V2X SLSS.

Aspect 19 is the method of any of aspects 14 to 18, where the relative velocity profile may include a maximum vehicle speed based on a real-time traffic database.

Aspect 20 is the method of any of aspects 14 to 19, where the relative velocity profile may include at least one of a first indicator of a speed of the second UE or a second indicator of a position of the second UE.

Aspect 21 is the method of any of aspects 14 to 20, where the second set of beacon signals may include at least one of (a) an RSU ID, (b) a first indicator of an RSU location, or (c) a second indicator of a transmission power.

Aspect 22 is the method of any of aspects 14 to 21, where calculating the relative velocity profile based on the second set of beacon signals may include measuring an RSSI of at least one of the second set of beacon signals. Calculating the relative velocity profile based on the second set of beacon signals may include calculating a distance from at least one of the set of RSUs based on the measured RSSI.

Aspect 23 is an apparatus for wireless communication, including: a memory; and at least one processor coupled to the memory and, based at least in part on information stored in the memory, the at least one processor is configured to implement any of aspects 1 to 22.

Aspect 24 is the apparatus of aspect 23, further including at least one of an antenna or a transceiver coupled to the at least one processor.

Aspect 25 is an apparatus for wireless communication including means for implementing any of aspects 1 to 22.

Aspect 26 is a computer-readable medium (e.g., a non-transitory computer-readable medium) storing computer executable code, where the code when executed by a processor causes the processor to implement any of aspects 1 to 22.

What is claimed is:

1. An apparatus for wireless communication at a first user equipment (UE), comprising:
    a memory; and
    at least one processor coupled to the memory and, based at least in part on information stored in the memory, the at least one processor is configured to:
        receive a first set of beacon signals from a set of global navigation satellite system (GNSS) devices; and
        restrict growth of a position uncertainty (PUNC) value associated with the first UE based on a maximum vehicle speed and based on a lack of a reception of a beacon signal from the set of GNSS devices within a threshold period of time.

2. The apparatus of claim 1, wherein the at least one processor is further configured to:
    obtain the maximum vehicle speed from an odometer of a vehicle associated with the first UE.

3. The apparatus of claim 1, wherein the at least one processor is further configured to:
    obtain the maximum vehicle speed from a real-time traffic database.

4. The apparatus of claim 1, wherein, to restrict growth of the PUNC value, the at least one processor is configured to restrict growth of the PUNC value further based on a relative velocity profile associated with the first UE.

5. The apparatus of claim 4, wherein the at least one processor is further configured to:
    receive a second set of beacon signals from a set of road side units (RSUs); and
    calculate the relative velocity profile based on the second set of beacon signals.

6. The apparatus of claim 5, wherein the second set of beacon signals comprise at least one of:
    an RSU identifier (ID);
    a first indicator of an RSU location; or
    a second indicator of a transmission power.

7. The apparatus of claim 5, wherein, to calculate the relative velocity profile based on the second set of beacon signals, the at least one processor is configured to:
    measure a reference signal strength indicator (RSSI) of at least one of the second set of beacon signals; and
    calculate a distance from at least one of the set of RSUs based on the measured RSSI.

8. The apparatus of claim 4, wherein the at least one processor is further configured to:
    receive a message comprising a second relative velocity profile from a second UE; and
    calculate the relative velocity profile based on the second relative velocity profile.

9. The apparatus of claim 8, wherein the second relative velocity profile comprises at least one of:
    a first indicator of a speed of the second UE; or
    a second indicator of a position of the second UE.

10. The apparatus of claim 8, wherein, to calculate the relative velocity profile based on the second relative velocity profile, the at least one processor is further configured to:
    measure a reference signal strength indicator (RSSI) of the message; and
    calculate a distance from the second UE based on the measured RSSI.

11. The apparatus of claim 8, wherein the message comprises a cellular vehicle to everything (C-V2X) sidelink synchronization signal (SLSS).

12. The apparatus of claim 1, wherein the at least one processor is further configured to:
    correct a calculated position of the first UE based on the PUNC value and a road map of an area associated with the calculated position of the first UE.

13. The apparatus of claim 1, wherein the at least one processor is further configured to:
    obtain an indication of a vehicle immobilization state; and
    freeze the PUNC value in response to obtaining the indication of the vehicle immobilization state.

14. The apparatus of claim 1, further comprising a transceiver coupled to the at least one processor, wherein the at least one processor is configured to:
    receive, via the transceiver, the first set of beacon signals from the set of GNSS devices.

15. An apparatus for wireless communication at a second user equipment (UE), comprising:
    a memory; and
    at least one processor coupled to the memory and, based at least in part on information stored in the memory, the at least one processor is configured to:
        receive at least a first set of beacon signals from a set of global navigation satellite system (GNSS) devices or a second set of beacon signals from a set of road side units (RSUs);
        calculate a relative velocity profile based on at least one of the first set of beacon signals or the second set of beacon signals; and
        transmit a set of messages comprising at least a portion of the relative velocity profile to a first UE.

16. The apparatus of claim 15, wherein, to transmit the set of messages, the at least one processor is configured to:
    periodically transmit a message of the set of messages to the first UE.

17. The apparatus of claim 15, wherein, to transmit the set of messages, the at least one processor is configured to:
    broadcast the set of messages.

18. The apparatus of claim 15, wherein, to transmit the set of messages, the at least one processor is configured to:
    transmit the set of messages in response to a lack of a reception of a beacon signal from the set of GNSS devices within a threshold period of time.

19. The apparatus of claim 15, wherein the set of messages comprises a cellular vehicle to everything (C-V2X) sidelink synchronization signal (SLSS).

20. The apparatus of claim 15, wherein the relative velocity profile comprises a maximum vehicle speed based on a real-time traffic database.

21. The apparatus of claim 15, wherein the relative velocity profile comprises at least one of:
    a first indicator of a speed of the second UE; or
    a second indicator of a position of the second UE.

22. The apparatus of claim 15, wherein the second set of beacon signals comprise at least one of:
    an RSU identifier (ID);

a first indicator of an RSU location; or
a second indicator of a transmission power.

23. The apparatus of claim 15, wherein, to calculate the relative velocity profile based on the second set of beacon signals, the at least one processor is configured to:
   measure a reference signal strength indicator (RSSI) of at least one of the second set of beacon signals; and
   calculate a distance from at least one of the set of RSUs based on the measured RSSI.

24. The apparatus of claim 15, further comprising a transceiver coupled to the at least one processor, wherein the at least one processor is configured to:
   receive, via the transceiver, at least the first set of beacon signals from the set of GNSS devices or the second set of beacon signals from the set of RSUs; and
   transmit, via the transceiver, the set of messages comprising at least the portion of the relative velocity profile to the first UE.

25. A method of wireless communication at a first user equipment (UE), comprising:
   receiving a first set of beacon signals from a set of global navigation satellite system (GNSS) devices; and
   restricting growth of a position uncertainty (PUNC) value associated with the first UE based on a maximum vehicle speed and based on a lack of a reception of a beacon signal from the set of GNSS devices within a threshold period of time.

26. The method of claim 25, wherein restricting growth of the PUNC value is further based on a relative velocity profile associated with the first UE.

27. The method of claim 26, further comprising:
   receiving a second set of beacon signals from a set of road side units (RSUs); and
   calculating the relative velocity profile based on the second set of beacon signals.

28. The method of claim 26, further comprising:
   receiving a message comprising a second relative velocity profile from a second UE; and
   calculating the relative velocity profile based on the second relative velocity profile.

29. A method of wireless communication at a second user equipment (UE), comprising:
   receiving at least a first set of beacon signals from a set of global navigation satellite system (GNSS) devices or a second set of beacon signals from a set of road side units (RSUs);
   calculating a relative velocity profile based on at least one of the first set of beacon signals or the second set of beacon signals; and
   transmitting a set of messages comprising at least a portion of the relative velocity profile to a first UE.

30. The method of claim 29, wherein transmitting the set of messages comprises:
   transmitting the set of messages in response to a lack of a reception of a beacon signal from the set of GNSS devices within a threshold period of time.

* * * * *